US012585892B2

(12) United States Patent　　　(10) Patent No.:　US 12,585,892 B2
　　Sharifi et al.　　　　　　　　　　(45) Date of Patent:　　Mar. 24, 2026

(54) AUTO-TRANSLATION OF CUSTOMIZED ASSISTANT

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 386 days.

(21) Appl. No.: 18/082,503

(22) Filed: Dec. 15, 2022

(65) Prior Publication Data

US 2024/0202469 A1　　Jun. 20, 2024

(51) Int. Cl.
　　*G06F 40/58*　　　　(2020.01)
　　*G06F 40/35*　　　　(2020.01)
　　*G06F 40/51*　　　　(2020.01)
(52) U.S. Cl.
　　CPC ..............  *G06F 40/58* (2020.01); *G06F 40/35* (2020.01); *G06F 40/51* (2020.01)
(58) Field of Classification Search
　　CPC ........... G06F 40/35; G06F 40/51; G06F 40/58
　　See application file for complete search history.

(56) References Cited

U.S. PATENT DOCUMENTS

| 10,984,784 B2 | 4/2021 | Kuczmarski | |
| 11,449,686 B1 * | 9/2022 | Panchal | G06F 40/51 |
| 2017/0169015 A1 * | 6/2017 | Huang | G06F 40/51 |

FOREIGN PATENT DOCUMENTS

| CN | 107526726 A | 12/2017 |
| WO | 2017112813 | 6/2017 |

OTHER PUBLICATIONS

Shi, L. et al., "Cross Language Text Classification by Model Translation and Semi-Supervised Learning"; Empirical Methods in Natural Language Processing, Association for Computational Linguistics; pp. 1057-1067; dated Oct. 9, 2010.
European Patent Office; International Search Report and Written Opinion issued in Application No. PCT/US2022/053184; 11 pages; dated Aug. 7, 2023.

* cited by examiner

*Primary Examiner* — Angela A Armstrong
(74) *Attorney, Agent, or Firm* — Gray Ice Higdon

(57)　　　　　　ABSTRACT

Implementations relate to automatically translating a customized automated assistant from a first language to a new language, so that the automated assistant can interpret spoken utterances in the new language and respond to such spoken utterances in the new language. For example, a customized automated assistant can be configured for use in a first language through the developer(s) providing input(s) that are in the first language, and thereafter automatically translated to a distinct second language for which no developer input is provided. The deployment of the customized automated assistant for utilization with the second language can be selective. For example, it can be selective in that it is only automatically deployed and/or is only suggested for deployment in response to determining that one or more objective criteria, that indicate accuracy and/or robustness of the second language translation of the customized automated assistant, are satisfied.

19 Claims, 11 Drawing Sheets

100C

Figure 2:
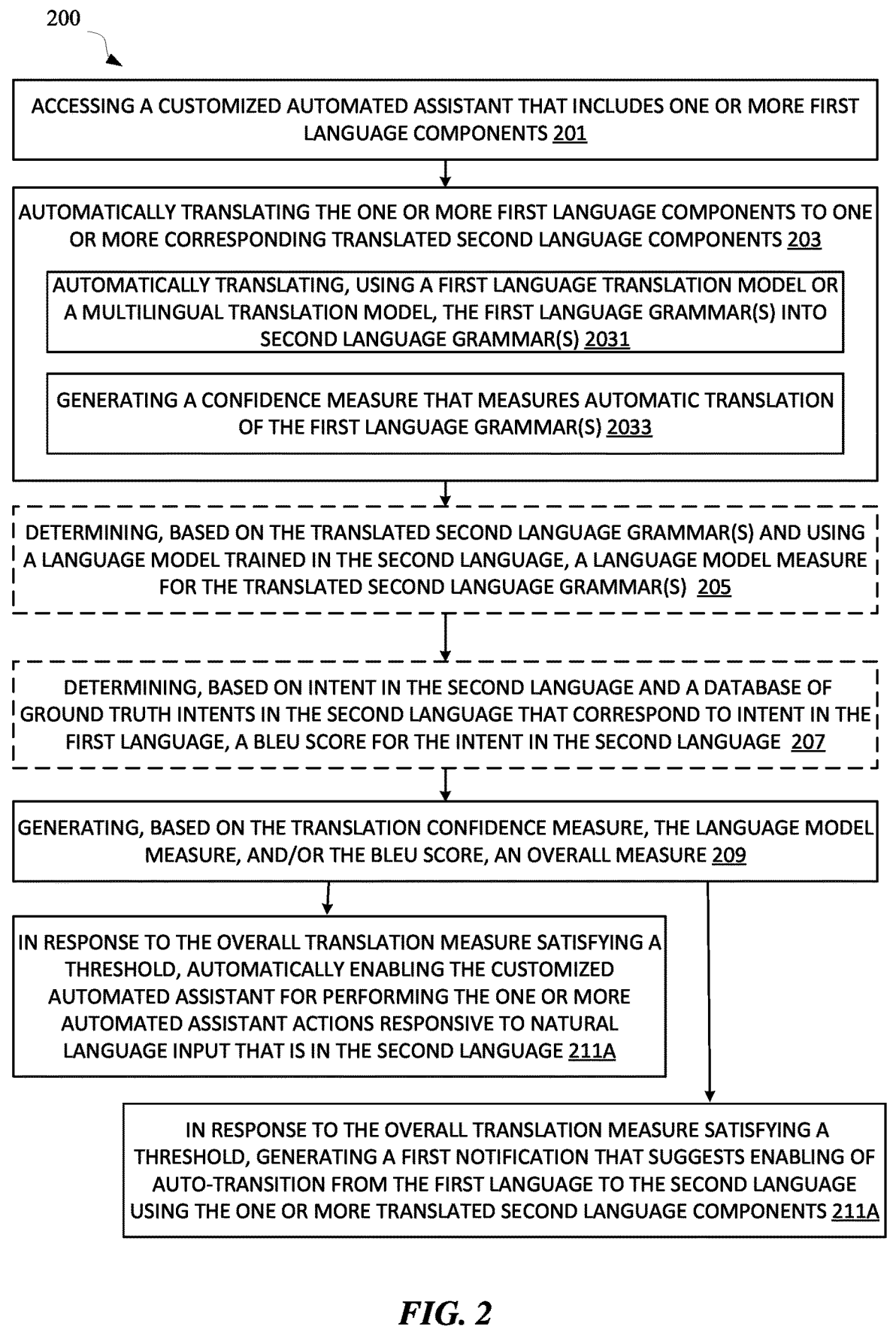

200

ACCESSING A CUSTOMIZED AUTOMATED ASSISTANT THAT INCLUDES ONE OR MORE FIRST LANGUAGE COMPONENTS 201

↓

AUTOMATICALLY TRANSLATING THE ONE OR MORE FIRST LANGUAGE COMPONENTS TO ONE OR MORE CORRESPONDING TRANSLATED SECOND LANGUAGE COMPONENTS 203

AUTOMATICALLY TRANSLATING, USING A FIRST LANGUAGE TRANSLATION MODEL OR A MULTILINGUAL TRANSLATION MODEL, THE FIRST LANGUAGE GRAMMAR(S) INTO SECOND LANGUAGE GRAMMAR(S) 2031

GENERATING A CONFIDENCE MEASURE THAT MEASURES AUTOMATIC TRANSLATION OF THE FIRST LANGUAGE GRAMMAR(S) 2033

↓

DETERMINING, BASED ON THE TRANSLATED SECOND LANGUAGE GRAMMAR(S) AND USING A LANGUAGE MODEL TRAINED IN THE SECOND LANGUAGE, A LANGUAGE MODEL MEASURE FOR THE TRANSLATED SECOND LANGUAGE GRAMMAR(S)  205

↓

DETERMINING, BASED ON INTENT IN THE SECOND LANGUAGE AND A DATABASE OF GROUND TRUTH INTENTS IN THE SECOND LANGUAGE THAT CORRESPOND TO INTENT IN THE FIRST LANGUAGE, A BLEU SCORE FOR THE INTENT IN THE SECOND LANGUAGE  207

↓

GENERATING, BASED ON THE TRANSLATION CONFIDENCE MEASURE, THE LANGUAGE MODEL MEASURE, AND/OR THE BLEU SCORE, AN OVERALL MEASURE 209

↓

IN RESPONSE TO THE OVERALL TRANSLATION MEASURE SATISFYING A THRESHOLD, AUTOMATICALLY ENABLING THE CUSTOMIZED AUTOMATED ASSISTANT FOR PERFORMING THE ONE OR MORE AUTOMATED ASSISTANT ACTIONS RESPONSIVE TO NATURAL LANGUAGE INPUT THAT IS IN THE SECOND LANGUAGE 211A

IN RESPONSE TO THE OVERALL TRANSLATION MEASURE SATISFYING A THRESHOLD, GENERATING A FIRST NOTIFICATION THAT SUGGESTS ENABLING OF AUTO-TRANSITION FROM THE FIRST LANGUAGE TO THE SECOND LANGUAGE USING THE ONE OR MORE TRANSLATED SECOND LANGUAGE COMPONENTS 211A

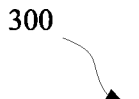

RECEIVING, VIA A CUSTOMIZED AUTOMATED ASSISTANT HAVING ONE OR MORE COMPONENTS TRANSLATED FROM A FIRST LANGUAGE TO A SECOND LANGUAGE, A SPOKEN UTTERANCE IN THE SECOND LANGUAGE 301

PERFORMING, VIA THE CUSTOMIZED AUTOMATED ASSISTANT HAVING ONE OR MORE COMPONENTS TRANSLATED FROM A FIRST LANGUAGE TO A SECOND LANGUAGE, AN AUTOMATED ASSISTANT ACTION RESPONSIVE TO THE SPOKEN UTTERANCE IN THE SECOND LANGUAGE 303

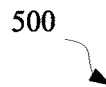

DETECTING A TRIGGERING EVENT THAT TRIGGERS AUTOMATIC TRANSLATION OF ONE OR MORE COMPONENTS OF AN AUTOMATED ASSISTANT 501

DETERMINING A TRANSLATION SCORE FOR THE AUTOMATIC TRANSLATION OF THE ONE OR MORE COMPONENTS 503

DETERMINING A LANGUAGE MODEL MEASURE USING THE ONE OR MORE TRANSLATED COMPONENTS IN THE SECONDARY LANGUAGE 505

DETERMINING A BLEU MEASURE USING THE ONE OR MORE TRANSLATED COMPONENTS IN THE SECONDARY LANGUAGE 507

DETERMINING AN OVERALL MEASURE BASED ON THE TRANSLATION MEASURE, THE LANGUAGE MODEL MEASURE, AND/OR THE BLEU MEASURE 509

DETERMINING WHETHER THE OVERALL MEASURE SATISFIES A PERFORMANCE THRESHOLD 511

IN RESPONSE TO DETERMINING THAT THE OVERALL MEASURE SATISFIES THE PERFORMANCE THRESHOLD, ENABLING THE AUTOMATED ASSISTANT TO PERFORM ONE OR MORE AUTOMATED ASSISTANT ACTIONS RESPONSIVE TO NATURAL LANGUAGE INPUT THAT IS IN THE SECONDARY LANGUAGE 513

FORWARDING A SUGGESTION TO THE DEVELOPER THAT SUGGESTS THE DEVELOPER TO ENABLE THE AUTOMATED ASSISTANT TO PERFORM ONE OR MORE AUTOMATED ASSISTANT ACTIONS RESPONSIVE TO NATURAL LANGUAGE INPUT THAT IS IN THE SECONDARY LANGUAGE 5131

IN RESPONSE TO RECEIVING USER PERMISSION TO ENABLE THE AUTOMATED ASSISTANT TO PERFORM ONE OR MORE AUTOMATED ASSISTANT ACTIONS RESPONSIVE TO NATURAL LANGUAGE INPUT THAT IS IN THE SECONDARY LANGUAGE, ENABLING THE AUTOMATED ASSISTANT TO PERFORM THE ONE OR MORE AUTOMATED ASSISTANT ACTIONS RESPONSIVE TO THE NATURAL LANGUAGE INPUT THAT IS IN THE SECONDARY LANGUAGE 5133

TRANSLATING THE ONE OR MORE COMPONENTS OF THE AUTOMATED ASSISTANT IN THE FIRST PRIMARY LANGUAGE USING A FIRST TRANSLATION MODEL TO GENERATE ONE OR MORE TRANSLATED COMPONENTS IN THE SECONDARY LANGUAGE AND TO GENERATE A FIRST CONFIDENCE SCORE, AND/OR TRANSLATING THE ONE OR MORE COMPONENTS OF THE AUTOMATED ASSISTANT IN THE SECOND PRIMARY LANGUAGE USING A SECOND TRANSLATION MODEL TO GENERATE ONE OR MORE TRANSLATED COMPONENTS IN THE SECONDARY LANGUAGE AND TO GENERATE A SECOND CONFIDENCE SCORE 5031

DETERMINING THE TRANSLATION SCORE, BASED ON THE FIRST CONFIDENCE SCORE, AND BASED ON THE SECOND CONFIDENCE SCORE 5033

*FIG. 5B*

RETRIEVING ONE OR MORE TRANSLATED GRAMMARS ("TRANSLATED INTENTS") IN THE SECONDARY LANGUAGE FROM THE ONE OR MORE TRANSLATED COMPONENTS 5071

RETRIEVING ONE OR MORE GROUND TRUTH INTENTS IN THE SECONDARY LANGUAGE THAT RESPECTIVELY CORRESPOND TO THE ONE OR MORE TRANSLATED INTENT IN THE SECONDARY LANGUAGE 5073

DETERMINING THE BLEU MEASURE BY MATCHING THE ONE OR MORE TRANSLATED INTENTS IN THE SECONDARY LANGUAGE WITH THE ONE OR MORE GROUND TRUTH INTENTS IN THE SECONDARY LANGUAGE 5075

AUTO-TRANSLATION OF CUSTOMIZED ASSISTANT

BACKGROUND

Humans can engage in human-to-computer dialogs with interactive software applications referred to herein as "automated assistants" (also referred to as "chatbots," "interactive personal assistants," "intelligent personal assistants," "personal voice assistants," "conversational agents," or simply "assistant," etc.). For example, humans (who when they interact with automated assistants may be referred to as "users") may provide commands/requests to an automated assistant using spoken natural language input (i.e., spoken utterances), which may in some cases be converted into text and then processed, and/or by providing textual (e.g., typed) natural language input. An automated assistant generally responds to a command or request by providing responsive user interface output (e.g., audible and/or graphical user interface output), controlling smart device(s), and/or performing other action(s).

An automated assistant may be configured to provide customized services or functions for user interaction that accommodates consumer needs. This can be accomplished by including one or more customized automated assistant components ("customized components") in the automated assistant based on developer inputs from a developer that configures the automated assistant. The one or more customized components, along with other default components ("standard components", if any), of the automated assistant can have script/code created in a desired language (e.g., an already supported and/or widely-used language such as English, a language popular in the area where the automated assistant is to be used, or a language already/originally supported by the automated assistant) so that the automated assistant (sometimes referred to as "customized automated assistant") can communicate (e.g., respond to commands or requests) with users in the desired language.

Such a customized automated assistant, since having (or otherwise accessing) no components in languages other than the desired language, can be incapable of communicating with the users in any language other than the desired language. This can cause the customized automated assistant to provide no response or action when a user speaks two or more languages interchangeably, or when the customized automated assistant receives user input or spoken utterance in a language other than the desired language. Moreover, configuring the automated assistant to become adept at communicating in multiple languages ("new languages") can be resource-intensive. For example, to configure a customized automated assistant to be responsive to large quantities of new languages, significant computing resources can be required (e.g., client device resource(s) for the configuring) and significant manual work from the developer can be required. For instance, additional natural language processing component(s) may need to be configured to recognize users' query intents (or simply "intents") in the new languages.

SUMMARY

Implementations disclosed herein relate to automatically (e.g., without any human intervention) translating an automated assistant (e.g., a customized automated assistant) from a first language to one or more new languages (e.g., at least a second language) so that the automated assistant can interpret spoken utterances in the one or more new languages and respond to such spoken utterances in the corresponding new language. For example, a customized automated assistant can be configured, by developer(s), for use in a first language through the developer(s) providing example(s) and/or programming input(s) that are in the first language. The customized automated assistant can thereafter be automatically translated to a second language, that is distinct from the first language and for which no developer input is provided (i.e., developer(s) have not configured it for use in the second language), to enable the customized automated assistant to be deployed for utilization with the second language.

As described herein, in various implementations the deployment of the customized automated assistant for utilization with the second language can be selective. In those various implementations it is selective in that it is only automatically deployed and/or is only suggested for deployment in response to determining that one or more objective criteria (e.g., translation confidence measure(s), BLEU score(s), language model measure(s), and/or other criterion/criteria), that indicate accuracy and/or robustness of the second language translation of the customized automated assistant, are satisfied. In these and other manners, the second language translation of the customized automated assistant can be automatically deployed and/or suggested for deployment only in situations where the second language translation of the customized automated assistant is objectively determined to be sufficiently accurate and/or robust. This can prevent deployment of a non-robust and/or non-accurate second language translation of the customized automated assistant, thereby preventing computationally burdensome utilization of an ineffective second language translation of the customized automated assistant. Further, and as also described herein, after the second language translation of the customized automated assistant is deployed, the objective criteria and/or one or more additional objective criteria can be generated and monitored (e.g., in view of developer changes to the first language customized automated assistant) and, if determined to not be satisfied, the second language translation of the customized automated assistant can be automatically undeployed and/or suggested for being undeployed. In these and other manners, the second language translation of the customized automated assistant can be monitored after deployment and undeployed when objective criteria indicate it is no longer robust and/or accurate.

Some implementations described herein relate to providing one or more components (e.g., default or standard component(s) for an automated assistant in the first language) to a developer for the developer to customize an automated assistant for the first language (i.e., by customizing the component(s)). For example, the developer can customize a standard automatic speech recognition (ASR) engine of the automated assistant by providing term(s) to which ASR should be biased, by providing training examples for fine tuning of model(s) used by the ASR engine (e.g., instances of audio data each capturing speech of a corresponding term, and a corresponding ground truth of the term for each of the instances). As another example, the developer can customize a standard NLU engine of the automated assistant by providing one or more customized grammars for mapping one or more first language inputs to one or more first language intents and/or to one or more first language fulfillments. The one or more first language intents, when provided, can be utilized to determine one or more responsive actions (or other fulfillments) of the automated assistant that are responsive to the one or more first language inputs. After being customized, the automated assistant can be referred to as a "customized automated assistant", and the one or more components, if configured in the first language based on explicit input of developer(s), can be referred to as "one or more first language components" or "one or more first language customized components".

Some implementations disclosed herein additionally or alternatively relate to accessing a customized automated assistant that includes the one or more first language customized components, where the one or more first language customized components are generated based on developer inputs from the developer in the first language, and are provided to enable the customized automated assistant to perform one or more automated assistant actions responsive to natural language input that is in the first language. Optionally or additionally, the customized automated assistant can include one or more components that are also customized by developer inputs and that are in an additional language different from the first language. The one or more components customized by the developer in the additional language can be provided to enable the customized automated assistant to perform one or more automated assistant actions responsive to natural language input that is in the additional language. The first language and the additional language, for example, can be popular languages within respective regions where the customized automated assistant is used or is intended to be used. As a non-limiting example, the first language can be English, and the additional language can be Spanish, if the customized automated assistant is to be used or popularized in an area where most people speak either English or Spanish. Literally, the developer can customize the automated assistant in as many default languages as possible to accommodate the needs for people speaking different languages. However, each time the developer customizes the automated assistant to be adept at an additional language in addition to the first language, a tremendous amount of computing resources and/or labor work would be needed.

Various implementations disclosed herein relate to automatically translating, using one or more translation models, the first language customized components to translated second language components in a second language different from any of the aforementioned languages (i.e., the language(s) of the customized automated assistant customized by developer input(s)). The first language customized components can include first language grammars that are customized by the developers. The first language grammars can include, for example, associations between representations of user utterances and representations of corresponding fulfillments for the user utterances, as customized by the developer. For example, the first language grammars can include: an association of the user utterance text "how are you" to the fulfillment of providing a visual and/or audible response of "terrific, thanks for asking"; an association of the user utterance regular expression "play <artist>" to the fulfillment regular expression of "send request to music1 app of "play [artist name=<artist>]"; an association of an intent of a user utterance (e.g., determined by a natural language processing engine) to a corresponding fulfillment. (e.g., play <music>) and/or first language intents (e.g., play a movie, play a song, etc.). Automatically translating the first language customized components to the translated second language components in the second language can include: automatically translating the one or more first language grammars (and/or the one or more first language intents) in the first language to the one or more translated second language grammars (and/or the one or more translated second language intents) in the second language).

When being used to automatically translate the first language customized components to the translated second language components in the second language, the one or more translation models can generate one or more individual confidence measures, where each individual confidence measure indicates/reflects a translation quality (or predicted confidence) in translating some of all of a respective first language customized component from the first language to the second language. For example, in translating first language grammars to second language grammars, multiple individual confidence measures can be generated, each corresponding to a respective portion of the translation of the grammars. The one or more individual confidence measures can be utilized, for example, to determine a translation score, which indicates a translation quality of the customized automated assistant (i.e., from the first language to the second language).

Various implementations disclosed herein additionally or alternatively relate to determining, based on the one or more translated second language components and using a language model trained in the second language, one or more language model measures. In some implementations, determining the one or more language model measures for the one or more translated second language components can include: determining one or more language model measures for the one or more translated second language grammars using the language model. In some other implementations, determining the one or more language model measures for the one or more translated second language components can further include: determining one or more language model measures for the one or more translated second language intents using the language model. Optionally, the one or more language model measures for the one or more translated second language grammars and/or the one or more language model measures for the one or more translated second language intents can be utilized to determine an overall language model measure ("a language model measure" or "a language model score").

Various implementations disclosed herein additionally or alternatively relate to determining, based on the one or more first language components and based on the one or more translated second language components, a BLEU measure ("BLEU score"). For example, code (e.g., source code) for the one or more translated second language components can be translated (e.g., using the one or more translation models) back to code for one or more translated first language components (in the first language), where the code for the one or more translated first language components can be compared to the code for the one or more first language components (i.e., ground-truth first language components), to obtain the BLEU measure. Alternatively, code for the one or more translated second language components do not need to be translated back to code for one or more translated first language components, and the ground-truth second language components (as well as code thereof) can be retrieved from a database over a cloud environment. In this case, the BLEU measure can be determined by comparing the code for the one or more translated second language components with the code for the ground-truth second language components.

In some implementations, the one or more first language components can include one or more first language grammars, and the one or more translated second language components can include one or more translated second language grammars. In some of those implementations, the BLEU measure can be determined by comparing the one or more translated second language grammars to a plurality of ground-truth grammars in the second language. In some other implementations, the BLEU measure can alternatively or additionally be determined by comparing the one or more translated second language intents to a plurality of ground-truth intents in the second language, and repeated descriptions are omitted herein.

In some implementations, additional or alternative metrics can be utilized, such as a model-based metric generated utilizing a model that is trained using human ratings. Such additional or alternative metrics can be, or can include, for instance, BLEURT and/or other model-based metric(s).

Various implementations disclosed herein relate to determining an overall score for the translated second language components. For example, the overall score can be determined as a function of the one or more individual confidence measures, the one or more language model measures, the BLEU score, and/or other applicable score(s). After being determined, the overall score can be compared to an automatic translation quality threshold that indicates a quality of the translated second language components in processing natural language content in the second language. In some implementations, if the overall score is determined to satisfy the automatic translation quality threshold, the translated second language components can be stored along with the one or more first language components, so that the customized automated assistant automatically becomes responsive to user input in both the first and second languages.

Various implementations disclosed herein relate to automatically enabling the customized automated assistant to respond to user input in the second language when the overall score satisfies an automatic translation quality threshold. After being enabled, the customized automated assistant can respond to user input in the second language, such as "what's the weather outside?"

In some implementations, instead of automatically enabling the customized automated assistant to respond to user input in the second language, a notification informing that the customized automated assistant is capable of responding to user input in the second language can be generated and forwarded to the developer, for the developer to determine whether or not to enable the customized automated assistant to respond to user input in the second language.

In various implementations, it is determined whether the overall score satisfies a first threshold, fails to satisfy the first threshold but satisfies a second threshold, or fails to satisfy both the first and second threshold. In those implementations: if it is determined to satisfy the first threshold, the customized assistant is automatically enabled for responding to user input in the second language; if it is determined to fail to satisfy the first threshold but satisfy the second threshold, the customized assistant will not be automatically enabled for responding to user input in the second language but such enabling will be recommended to a developer and enabled upon approval from the developer; and if it is determined to fail both the first threshold and the second threshold, the customized assistant will not be automatically enabled for responding to user input in the second language and such enabling will not be recommended to a developer.

The above is provided merely as an overview of some implementations. Those and/or other implementations are disclosed in more detail herein.

Various implementations can include a non-transitory computer readable storage medium storing instructions executable by a processor to perform a method such as one or more of the methods described herein. Yet other various implementations can include a system including memory and one or more hardware processors operable to execute instructions, stored in the memory, to perform a method such as one or more of the methods described herein.

BRIEF DESCRIPTION OF THE DRAWINGS

FIG. 2 is a flowchart illustrating an example method for automatically translating one or more components of a customized automated assistant, in accordance with various implementations.

FIG. 3 is a flowchart illustrating an example method that uses one or more translated components of a customized automated assistant to respond to user input, in accordance with various implementations.

FIG. 5A, FIG. 5B, and FIG. 5C are flowcharts illustrating another example method for automatically translating a customized automated assistant, in accordance with various implementations.

DETAILED DESCRIPTION

Figure 1A:
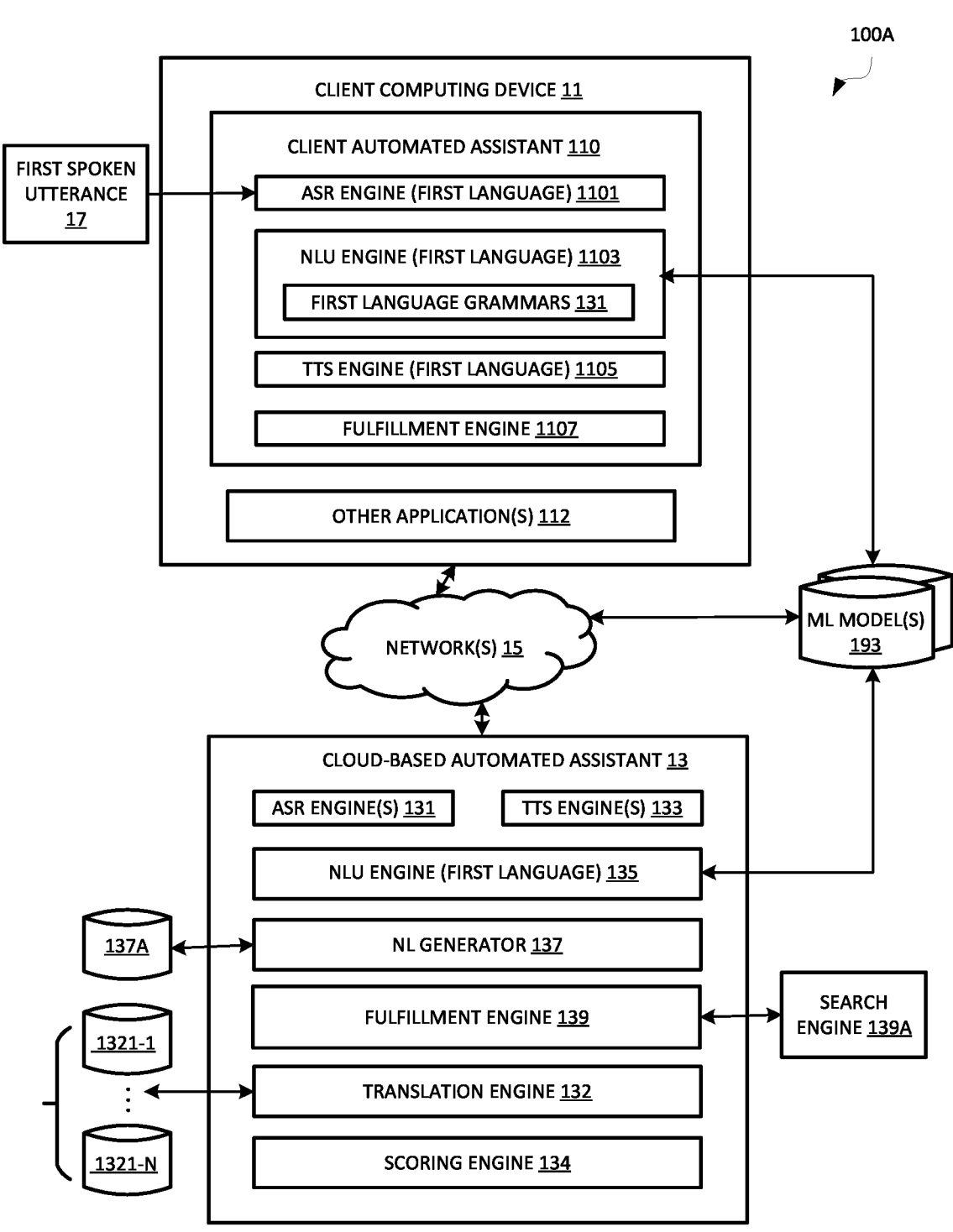
FIG. 1A depicts a block diagram of an example environment that demonstrates various aspects of the present disclosure, and in which implementations disclosed herein can be implemented.

FIG. 1A is a block diagram of an example environment (or system) 100A that demonstrates various aspects of the present disclosure, and in which implementations disclosed herein may be implemented. As shown in FIG. 1A, the environment 100A can include a client computing device 11, where the client computing device 11 can be, for example, a cell phone, a stand-alone interactive speaker, a computer (e.g., laptop, desktop, notebook), a tablet, a robot, a smart appliance (e.g., smart TV), a messaging device, an in-vehicle device (e.g., in-vehicle navigation system or in-vehicle entertainment system), a wearable device (e.g., watch or glasses), a virtual reality (VR) device, an augmented reality (AV) device, or a personal digital assistant (PDA), and the present disclosure is not limited thereto. In various implementations, the client computing device 11 can be installed with a client automated assistant 110. Optionally, the client computing device 11 can be installed with, or otherwise access, one or more other applications 112 (e.g., a messaging application, a browser, etc.), in addition to the client automated assistant 110.

The client automated assistant 110 can have a plurality of local components including, for example, an automatic speech recognition (ASR) engine 1101, a natural language understanding (NLU) engine 1103, a text-to-speech (TTS) engine 1105, and/or a fulfillment engine 1107. The plurality of local components of the client automated assistant 110 can be customized by an application developer ("developer") via developer input, where the client automated assistant 110 can be customized based on a type, function(s), and/or a region associated with the client computing device 11 (at which the client automated assistant 110 is installed). Alternatively or additionally, the plurality of the aforementioned local components customized by the developer can be stored and/or accessed at a server computing device (not shown) that is in communication with the client computing device 11.

Optionally, instead of customizing all local components of the client automated assistant 110, the developer may be able to customize one or more of the aforementioned local components, along with using one or more other components that are standard components ("default components") offered or shared by an administrator computing device (not shown). As a non-limiting example, the administrator computing device can transmit an application template to a developer computing device (not shown), for the developer to customize the client automated assistant 110, e.g., by providing one or more developer inputs at one or more corresponding input fields of the application template. For instance, the developer may determine a particular name (e.g., brand name) for the client automated assistant 110, and type in the determined particular name at an input field of the application template to specify the determined particular name as a hotword or hot phrase ("invoking phrase"), where when received by the client automated assistant 110, the hotword or hot phrase invokes the client automated assistant 110 for interaction(s) with an end user ("user") of the client computing device 11. The client automated assistant 110, when having at least one component customized by a developer, can be referred to as a "customized automated assistant".

Alternatively or additionally, the developer can customize the client automated assistant 110 by defining one or more grammars and one or more corresponding intents. For example, the developer can define the one or more grammars to include a first grammar with (or without) one or more slots that can be filled with corresponding slot value(s), where the first grammar can be "search <information>", in which the slot "information" can be automatically filled with a value "weather" when the client automated assistant 110 receives a user query (e.g., spoken utterance), i.e., "Assistant, what's the weather?". In this example, the developer can define the one or more corresponding intents to include a first intent that corresponds to the first grammar, where the first intent is to invoke one or more responsive actions that causes a search for the weather and/or causes a search result of the search (for the weather) to be rendered via the client computing device 11. Optionally, the one or more grammars can include a second grammar, e.g., "book flight to <destination> on <date>", which can be mapped to a second intent corresponding to the second grammar. The second intent here can invoke a responsive action that causes a third-party flight-booking app to initiate a search of flight(s) from a current location of the client computing device 11 to the destination on a particular date, where the destination and the particular date can be determined from user input. In this case, when the user input is, e.g., "Assistant, book me a flight to Paris", which is able to provide a slot value (e.g., Paris) for the first slot (i.e., <destination>) but is unable to provide a slot value for the second slot (i.e., <date>), the client automated assistant 110 can solicit further user input with respect to the slot value for the second slot <date>, and/or other information needed to fulfill the responsive action that the second intent invokes. The one or more grammars and the one or more intents respectively corresponding to the one or more grammars can, for example, be defined by the developer based on: a type of the client automated assistant 110, services/functions of the client automated assistant 110, and/or responsive actions performable by the client computing device 11 (or third-party devices or applications in communication with the client automated assistant 110).

In some implementations, the hotword or hot phrase, the one or more grammars, and the one or more corresponding intents can be customized by the developer using a first language, and the developer may customize the other components of the client automated assistant 110 using the first language (or otherwise use default components configured and provided by the administrator computing device in the first language). Here, the first language can be, e.g., English, determined based on a region ("area") where the client computing device 11 is located or targeted for use/popularization.

For example, the client computing device 11 may be a stand-alone speaker targeted mainly for use by users in North America. In this example, an input device (e.g., a microphone) of the client computing device 11 can be expected to receive audio data that captures spoken utterances in the first language, e.g., English. Here, the developer of the client automated assistant 110 may use a default ASR engine provided by the administrator computing device in the first language as the ASR engine 1101, or otherwise customize the ASR engine 1101 using code in the first language, to process audio data that captures spoken utterance(s) in the first language. As mentioned previously, the developer can customize the ASR engine 1101 to recognize one or more particular hotwords (e.g., a term or phrase promoting the brand of the stand-alone speaker), where the customized ASR engine 1101 processes only spoken utterance(s) subsequent to the audio data that captures any of the one or more particular hotwords. Here, the customized ASR engine 1101 can process the audio data that captures the spoken utterance(s) in the first language, to generate a speech recognition of the spoken utterance(s) in the first language. In this example, the customized ASR engine 1101 can be incapable of processing audio data that captures spoken utterance(s) in languages (e.g., German) other than the first language (e.g., English).

Continuing with the aforementioned example, the client automated assistant 110 may use a natural language processor 1103A included in the NLU engine 1103, to process the aforementioned speech recognition of the spoken utterance(s) in the first language, thereby determining semantic meaning(s) of the spoken utterance(s) in the first language. The natural language processor 1103A can, for example, process a speech recognition of a user query (e.g., "What's the weather?") in natural language (i.e., first language) to generate an annotated output in the first language. The annotated output can, for example, include one or more (e.g., all) terms of the speech recognition of the user query in the first language, and one or more annotations of the speech recognition of the user query. The one or more annotations can, for example, include one or more first-type annotations that annotate the one or more terms with their grammatical roles (e.g., "noun", "verb", "adjective", "pronoun", etc.). Alternatively or additionally, the one or more annotations can include one or more second-type annotations that indicate syntactic relationships (e.g., one term is dependent on another) between the one or more terms in the speech recognition of the user query. Alternatively or additionally, the one or more annotations can include one or more third-type annotations (e.g., entity tags) that identify one or more entities (e.g., a celebrity, a location, content to be searched, a date, etc.) in the speech recognition of the user query. Optionally, the natural language processor 1103A can, for example, be provided by the administrator computing device as one of the default components for the client automated assistant 110 in the first language.

Continuing with the aforementioned example, the client automated assistant 110 may use an intent matcher 1103B included in the NLU engine 1103, to identify an intent of the user query (e.g., "What's the weather?"). In this example, the intent matcher 1103B can utilize the one or more grammars to determine whether the annotated output generated based on the speech recognition of the user query in the first language, corresponds to any grammar, of the one or more grammars. Here, the annotated output can be determined to correspond to the first grammar, i.e., "search <information>", with the slot <information> being automatically filled with a slot value "weather". Based on a mapping relationship between the first grammar and the first intent as described above (i.e., the first grammar being mapped to the first intent), the intent matcher 1103B can determine the first intent (i.e., invoke one or more responsive actions that cause a search for weather to be performed and a search result for the weather to be rendered) as the intent of the user query. As mentioned previously, the one or more grammars, the one or more intents, and/or the mapping relationships between the one or more grammars and the one or more intents can be defined by the developer based on the type and/or functions of the client automated assistant 110. In other words, the developer may customize the NLU engine 1103 by, for example, customizing code for the intent matcher 1103B to utilize the one or more grammars in the first language to determine an intent in the first language for a user query. Optionally or additionally, the developer may utilize some code in the first language that are provided by the administrator computing device, to complete the configuration of the intent matcher 1103B (or the NLU engine 1103, sometimes referred to as "customized NLU engine").

In some implementations, the intent matcher 1103B can be included in the natural language processor 1103A, and the natural language processor 1103A (or more generally, the NLU engine 1103) can determine semantic meaning(s) of a speech recognition of the spoken utterance(s) (in the first language) generated by the ASR engine 1101. The NLU engine 1103 can decompose the determined semantic meaning(s) in the first language, to determine intent(s) in the first language that characterize one or more responsive actions (e.g., one or more automated assistant actions performable by the customized automated assistant 110). For instance, the NLU engine 1103 can be utilized to determine a third intent (e.g., turn off the kitchen light), of the aforementioned one or more intents in the first language, for the client automated assistant 110 to perform an assistant action (e.g., cause a smart light A in the kitchen to be turned off) based on a speech recognition of a first spoken utterance 17 in the first language (e.g., "Assistant, turn off the light in the kitchen"). Here, the speech recognition in the first language is generated by using the ASR engine 1101 to process the first spoken utterance 17 in the first language.

Continuing with the implementations above, the NLU engine 1103 can process the speech recognition of the first spoken utterance 17 in the first language to generate an annotated output (e.g., in textual form) in the first language, where the annotated output can include (1) the speech recognition of the first spoken utterance 17 in the first language, (2) speech tag(s) in the first language that annotate one or more terms (or morphemes) in the speech recognition of the first spoken utterance 17 with their grammatical roles; and/or other annotations. The speech tag(s) can tag each term that is part of the speech recognition of the first spoken utterance 17 in the first language, using tags such as "noun" (e.g., for "light" as well as "kitchen" in "turn off the light in the kitchen"), "verb" (e.g., for "turn off" in "turn off the light in the kitchen"), and "preposition" (e.g., for "in" in "turn off the light in the kitchen"). Optionally or additionally, the other annotations can include entity tags, such as people (celebrity, public figure, family member, literary character, etc.), organizations (school, company, etc.), and locations (e.g., lake, city, etc.). Optionally or additionally, the other tags can include tags specifying annotated syntactic relationships in the first language between the one or more terms in the speech recognition of the first spoken utterance 17. For instance, the annotated syntactic relationships can indicate or determine a dependency of one term on another, e.g., which terms modify other terms, subjects, and verbs of sentences.

Optionally, the NLU engine 1103 can utilize one or more grammars customized by the developer in the first language, to determine whether the annotated output in the first language corresponds to an intent (i.e., words or phrases) that is intended to invoke one or more responsive actions by the customized automated assistant 110 and/or by a third-party application. For example, the NLU engine 1103 can access first language grammars 131 (or a mapping table 191 in FIG. 1B), defined by the developer in the first language and stored in a database 19, that maps each of one or more grammars in the first language to a corresponding intent, of one or more intents ("actions", or "responsive actions") of the customized automated assistant 110, to determine an intent corresponding to the first spoken utterance 17 in the first language. For example, one grammar, "turn off <device>", can be mapped to an intent to invoke a responsive action of the client automated assistant 110 that causes a corresponding device to be turned off. Another grammar, "<service> nearby", can be mapped to an intent to invoke a responsive action of the customized automated assistant 110 that causes a search engine (or other Apps such as food-ordering app, navigation app, food review app) of the client computing device 11 to search a database (or the Internet) for a specified service (e.g., restaurant) nearby. Optionally or additionally, in addition to determining the intent, the NLU engine 1103 can utilize the speech recognition to determine one or more parameters for the intent. For example, a grammar, "set <temperature> at <location>" can be identified for a spoken utterance, e.g., "Assistant, set living room temperature at 72", with the slot <temperature> automatically filled with slot value "72F" and the slot <location> automatically filled with slot value "living room". In this example, the NLU engine 1103 can utilize the grammar filled with the slot values to determine an intent (e.g., set temperature), as well as a first parameter (e.g., "72F") and a second parameter (e.g., "living room") for the intent. Optionally, the NLU engine 1103 can determine that the temperature needs to be set by a thermostat (which is a third parameter for the intent), by checking third-party devices that can control temperature in the living room. Based on the determined intent and the first, second, and/or third parameters, a responsive action of the customized automated assistant 110 can be performed, which causes the thermostat in the living room to set the temperature to 72 F.

Optionally, instead of or in addition to the mapping table 191, the NLU engine 1103 can access one or more models trained in the first language to process a speech recognition of a spoken utterance, thereby determining an intent for the spoken utterance. For example, to process the speech recognition of the first spoken utterance 17 in the first language (or alternatively, a natural language text in the first language received from touch input, camera input, or keyboard input from a user), the NLU engine 1103 can utilize one or more NLU machine learning models trained in the first language, out of the one or more ML models 193 (which may or may not be stored in a database 19), in determining the intent in the first language. Here, like the ASR engine 1101, the NLU engine 1103 may not be able to process, for example, natural language text (or speech recognition) in a second language that is different from the first language, in order to determine intent(s) and/or parameter(s) for the customized automated assistant 110 to perform a corresponding automated assistant action (e.g., perform a search, or control a third-party device).

In some implementations, the NLU engine 1103 may be able to resolve the intent(s) in the first language and/or parameter(s) in the first language, based on a single utterance of a user in the first language. If not, in some implementations, prompts (in the first language) can be generated based on unresolved intent(s) and/or parameter(s), where those prompts can be rendered to a user of the client computing device 11, and user response(s) to those prompt(s) can be utilized by the NLU engine 1103 in resolving intent(s) and/or parameter(s). In those implementations, the NLU engine 1103 can optionally work in concert with a dialog manager engine (not illustrated) that determines unresolved intent(s) and/or parameter(s) and/or generates corresponding prompt(s).

In various implementations, the fulfillment engine 1107 of the automated assistant 110 can receive an intent in the first language and/or the parameter(s) in the first language, to fulfill the intent by performing one or more responsive actions. For example, the fulfillment engine 1107 can receive the aforementioned first intent in the first language to cause a search engine (e.g., search engine 139A) of the client computing device 11 to search the Internet for weather, and fulfill the intent by: (1) causing the search engine to search the Internet for weather (e.g., local weather as of now, since specific time or location is not identified in the user query, "what's the weather?"), (2) generating fulfillment information (e.g., "it's cloudy outside, with a temperature of 26° C.") in the first language, based on a search result (e.g., "Louisville, KY, Monday 11:00 am, cloudy, 26° C.") for the weather, and/or (3) rendering the fulfillment information to the user of the client computing device 11. As another example, the fulfillment engine 1107 can receive an intent and/or parameter(s) in the first language to cause a thermostat in the living room to set the temperature at 72 F, and fulfill the intent by generating and forwarding a control signal to the thermostat in the living room, where the control signal causes the thermostat to set the temperature at 72 F.

Optionally, when the NLU engine 1103 cannot resolve the intent(s) in the first language and/or cannot determine all parameter(s) in the first language for the intent(s) to fulfill a responsive action, the developer customizing the client automated assistant 110 may customize the fulfillment engine 1107 to generate a default response in the first language, e.g., "Sorry, I don't understand. Please try another request". Here, the default response can be customized by the developer based on the functions or the type of the client automated assistant 110.

Continuing with the aforementioned example, the developer customizing the client automated assistant 110 can configure the TTS engine 1105 to convert text in the first language to synthesized speech in the first language using a particular voice. To do so, the developer may rely on one or more speech synthesis neural network models trained in the first language, where the one or more speech synthesis neural network models can be provided by the administrator computing device or retrieved over the cloud. Optionally, the developer can themselves train the one or more speech synthesis neural network models. The TTS engine 1105 can be utilized, for example, to convert a textual response (e.g., "cloudy" in English) into audio data that includes a synthesized version (e.g., "weather tomorrow will be cloudy") of the text (e.g., "weather tomorrow?"), and the synthesized version can be audibly rendered via hardware speaker(s) of the client computing device 11 (e.g., a stand-alone speaker) or via another device (e.g., a cell phone).

In various implementations, the client automated assistant 110 can communicate with a cloud-based automated assistant 13 via one or more networks 15 to perform one or more function ("tasks") or automated assistant actions, where the one or more networks 15 can include, for example, a local area network (LAN), a wide area network (WAN) such as the Internet, and/or any other appropriate network. The cloud-based automated assistant 13 can leverage the virtually limitless resources of the cloud for enhanced computing capability, and can include a plurality of cloud-based components including, for example, a cloud-based ASR engine 131, a cloud-based TTS engine 133, a scoring engine 134, a cloud-based NLU engine 135, a cloud-based content generator 137, and/or a cloud-based fulfillment engine 139. The cloud-based ASR engine 131 can be counterpart of the ASR engine 1101, or can be an enhanced ASR engine that is capable of processing audio data that captures spoken utterances in the second language, in addition to processing audio data that captures spoken utterances in the first language. The cloud-based TTS engine 133 can be a counterpart of the TTS engine 1105, or can be an enhanced TTS engine that is capable of converting natural language content in the second language to speech(es) in the second language, in addition to converting natural language content in the first language to speech(es) in the first language. The cloud-based NLU engine 135 can be a counterpart of the NLU engine 1103 (i.e., NLU engine customized by the developer), and the cloud-based fulfillment engine 139 can be a counterpart of the fulfillment engine 1107. Repeated descriptions, e.g., descriptions of the one or more cloud-based components as counterparts of the one or more local components of the client automated assistant 110, are omitted herein.

In various implementations, to enable the client computing device 11 (installed with a client automated assistant 110 configured in the first language only and having one or more components customized by the developer) to process audio data that captures spoken utterance(s) in a second language different from the first language without additional contribution of resources or labor from the developer, the cloud-based automated assistant 13 can be configured to include a translation engine 132. The translation engine 132 can be configured to, for example, automatically translate one or more (local) components of the client automated assistant 110 (e.g., the customized NLU engine 1103 and/or the mapping table 191) from the first language to the second language. The one or more translated components in the second language, if determined to be of high-quality (will be described in more details later in this disclosure), can be stored as a translated automated assistant in second language (in case the one or more translated components in the second language cover all components needed to fulfill an assistant) or be stored as a partially translated automated assistant in the second language (in case the developer needs to request or access one or more additional components in the second language via the administrator computing device).

Figure 1B:
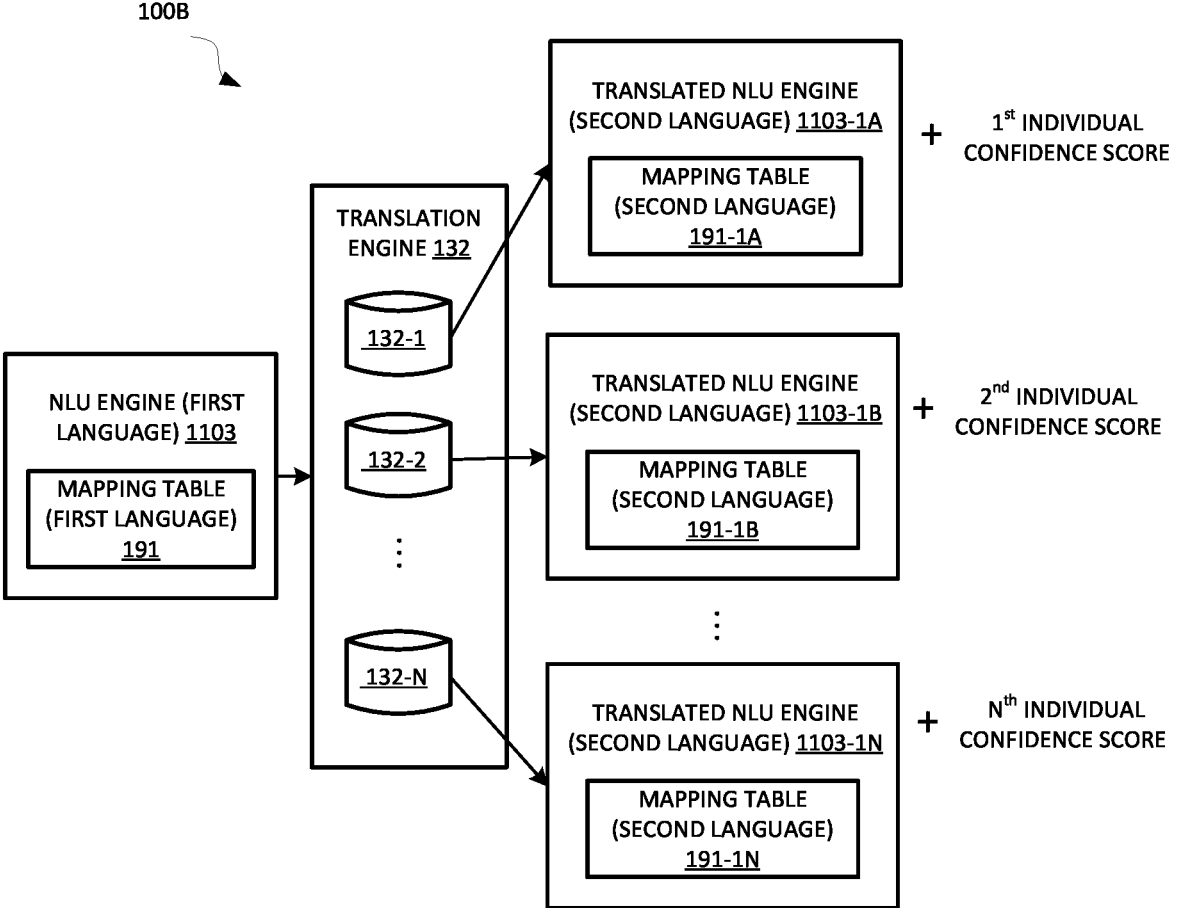
FIG. 1B depicts an example process flow that generates one or more individual confidence scores using the translation engine in FIG. 1A, in accordance with various implementations.
Figure 1C:
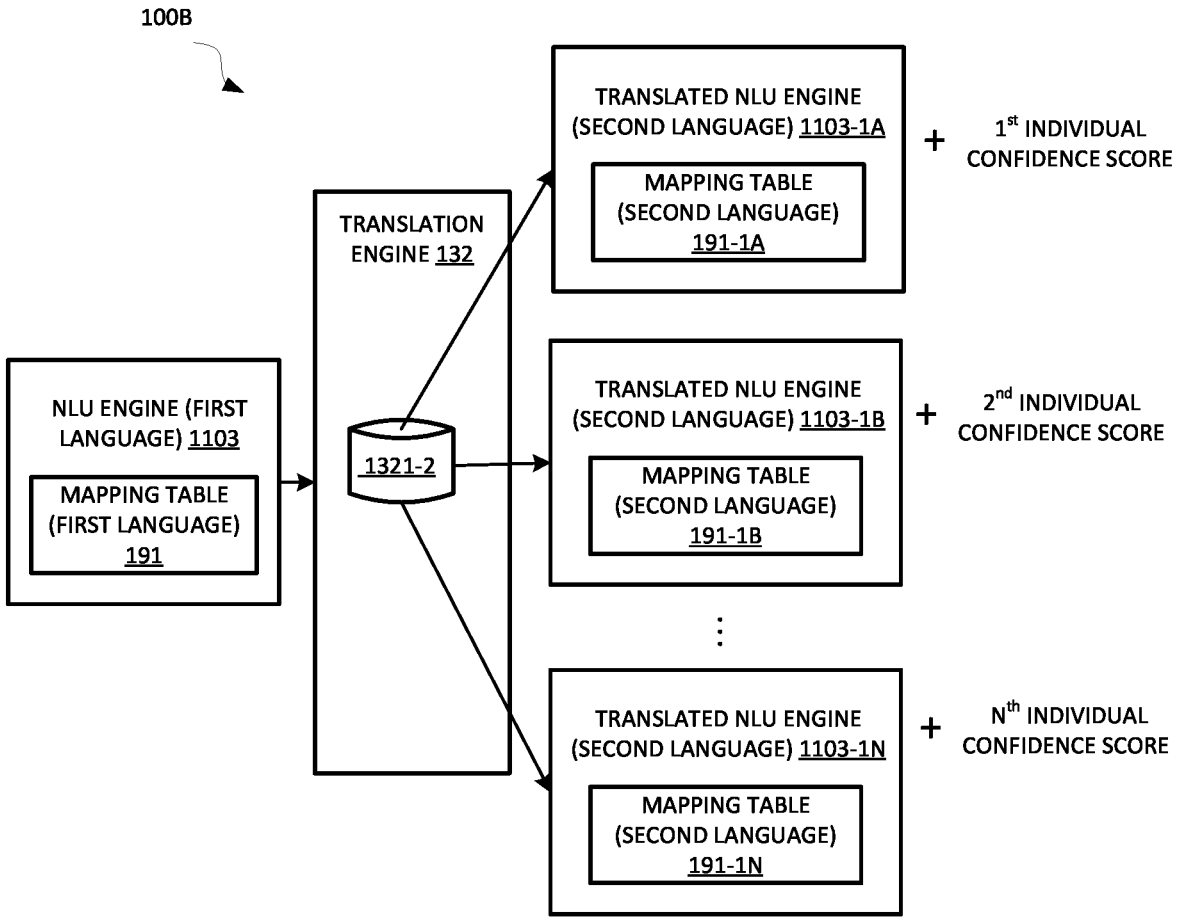
FIG. 1C depicts a variation of the example process flow in FIG. 1B, in accordance with various implementations.

As a non-limiting example, referring to FIG. 1B, the translation engine 132 can automatically translate, using one or more translation models (e.g., translation model 132-1~translation model 132-N) trained to translate from the first language to the second language (and/or vice versa), the customized NLU engine 1103 and the mapping table 191 included in (or otherwise accessible by) the customized NLU engine 1103, to generate one or more translated NLU engines (1103-1A, 1103-1B, . . . , 1103-1N) in the second language and corresponding translated mapping tables (e.g., 191-1A~191-1N, that are in the second language). The translation model 132-1 and/or other translation models (e.g., 132-N) can, for example, each be a sequence-to-sequence neural network (e.g., LSTM, Transformer). Alternatively, instead of using one or more translation models where the one or more translation models (e.g., 132-1~132-N) respectively translate the first language into a different language (e.g., the second language), the translation engine 132 can use a multilingual translation model 132A (see FIG. 1C) trained to translate from the first language to a plurality of languages (and/or vice versa), instead of or in addition to the one or more translation models (e.g., 132-1~132-N). The multilingual translation model 132A can be fine-tuned on the first language to which the customized automated assistant 110 is configured to respond. Optionally, the multilingual translation model 132A can learn to translate one or more languages outside of the plurality of languages, through transfer learning.

In some implementations, automatically translating the customized NLU engine 1103 can include: automatically translating code for the customized NLU engine 1103, where the code for the customized NLU engine 1103 can include (optionally) the mapping table 191 in the first language.

Optionally, automatically translating the code for the customized NLU engine 1103 can include: automatically translating the mapping table 191 in the first language to one or more translated mapping tables in the second language. Here, automatically translating the mapping table 191 in the first language to a translated mapping table 191-1A in the second language can include: using a first translation model 132-1 to automatically translate each entry of the mapping table 191 in the first language (e.g., English), that maps a grammar in the first language (e.g., play <music>) to a corresponding intent in the first language (e.g., play [music] using app B), into a translated entry in the second language (e.g., German) that maps a translated grammar (e.g., <Lied> spielen) in the second language to a correspondingly translated intent (Spiele [Musik] mit App B) in the second language. Here, the one or more translated entries together form the translated mapping table 191-1A (see FIG. 1C) in the second language. Similarly, the mapping table 191 in the first language can be automatically translated into a translated mapping table 191-1B, . . . , or a translated mapping table 191-1N.

In some implementations, automatically translating the one or more (local) components of the client automated assistant 110 (e.g., the customized NLU engine 1103) can be performed periodically, or can be triggered by one or more events. For example, automatically translating the customized NLU engine 1103 can be performed or repeated once every week (or after a certain number of user queries have been received). As another example, automatically translating the customized NLU engine 1103 can be performed in response to a total number of users using a language other than the first language to interact with the client automated assistant 110 satisfying a threshold quantity of user, and/or can be performed in response to the client computing device 11 being detected within a particular region or country. For example, a user of the client computing device 11 may travel from the United States to Switzerland (where languages such as German, French, and Italian are more frequently used than English) for a one-month business trip, and in response to detecting that the client computing device 11 is within a territory of Switzerland, automatically translating the customized NLU engine 1103 from the first language (i.e., English) to additional languages (i.e., German, French, and Italian) can be respectively performed using corresponding translation models via the translation engine 132.

In the above case, as a non-limiting example, if a translation score of the translated NLU engine in German (or a portion thereof) satisfies the automatic translation quality threshold, automatic translation function from English to German can be automatically enabled so that the customized automated assistant 110 can respond to spoken utterances or other user input (textual input) in German, in addition to responding to spoken utterances in English. Optionally, in this non-limiting example, the customized automated assistant 110 can selectively respond to certain spoken utterances or other user input (textual input) in German.

As a further example, automatically translating the customized NLU engine 1103 can be performed in response to receiving user input (e.g., spoken utterance) in the second language for a threshold number of times. The threshold number of times of receiving user input in the second language to trigger the automatic translation can be, for example, 1, 2, or 4, depending on the configuration or definition by the developer. As an additional example, automatically translating the customized NLU engine 1103 can be performed in response to the developer upgrading or modifying the one or more components of the customized automated assistant 110 (e.g., adding a third language different from the first and second language as a default language to which the customized automated assistant 110 is configured to respond, fix a coding bug, etc.)

In various implementations, the one or more translation models (132-1~132-N) can each output an individual confidence score ("individual confidence measure", which can be in the form of numerical number, such as 0.65 using a scale from 0 to 1) that evaluates a quality of the automatic translation process during which the customized NLU engine 1103 (which can include the mapping table 191 or the one or more intents) in the first language is automatically translated to a corresponding translated NLU engine (e.g., 1103-1A, 1103-1B, . . . , or 1103-1N) in the second language. In this case, a plurality of individual confidence scores (e.g., $1^{st}$ individual confidence score, $2^{nd}$ individual confidence score, . . . , Nth individual confidence score, that are shown in FIG. 1B) may be generated if a plurality of translation models (132-1~132-N) are tested for automatic translation, and based on the plurality of individual confidence scores, the scoring engine 134 can generate a translation score.

In various implementations, the translation score can be considered to satisfy a translation threshold if at least one of the individual confidence scores satisfies a predetermined threshold (e.g., 0.6, which can be defined by the developer), no matter whether or not all other individual confidence score fail to satisfy the predetermined threshold. In this case, having at least one individual confidence score to satisfy the predetermined threshold means at least one of the translation models (132-1~132-N) can produce satisfying automatic translation (from the first language to the second language) for the customized NLU engine 1103. For example, the plurality of individual confidence scores can include a first individual confidence score (i.e., 0.65>the predetermined threshold 0.6) output by a first translation model 132-1, a second individual confidence score (i.e., 0.48) output by a second translation model 132-2, and a third individual confidence score (i.e., 0.34) output by a third translation model 132-3. In this example, the translation score can be considered to satisfy the translation threshold, where the translation threshold can be the same (i.e., 0.6) as or different from the predetermined threshold i.e., being 0.58 or 0.62).

Optionally, the translation score can be calculated by the scoring engine 134 using only those individual confidence scores that satisfy the predetermined threshold, and without considering individual confidence score(s) that do not satisfy the predetermined threshold. Continuing with the example above, the translation score can be calculated using the first individual confidence score (i.e., 0.65), without considering the second individual confidence score (i.e., 0.48) and the third individual confidence score (i.e., 0.34).

If none of the individual confidence scores satisfies the predetermined threshold, the translation score is considered to have failed the translation threshold, indicating none of the one or more translation models (132-1~132-N) produces satisfying or high-quality automatic translation of the customized NLU engine 1103.

If there are two or more individual confidence scores satisfying the predetermined threshold, the translation score can be determined based on the two or more individual confidence scores that satisfy the predetermined threshold (without considering the individual confidence scores that fail the predetermined threshold). For example, the plurality of individual confidence scores can include a first individual confidence score (i.e., 0.65>the predetermined threshold 0.6) output by a first translation model 132-1, a second individual confidence score (i.e., 0.48) output by a second translation model 132-2, and a third individual confidence score (i.e., 0.72) output by a third translation model 132-3. In this example, the translation score can be calculated by the scoring engine 134 using the first individual confidence score (i.e., 0.65) and the third individual confidence score (i.e., 0.72). The scoring engine 134, for example, can calculate the average (i.e., 0.685) of the first individual confidence score (i.e., 0.65) and the third individual confidence score (i.e., 0.72), as the overall translation score. In this case, the translated NLU engine 1103-1A (to which the first individual confidence score, i.e., 0.65, corresponds) and the translated NLU engine 1103-1C (not shown in FIG. 1C, to which the third individual confidence score, i.e., 0.72, corresponds) can be stored as one or more additional components, of the client automated assistant 110 and/or of the cloud-based automated assistant 13, for further use (e.g., processing a speech recognition in the second language).

For example, a translated NLU engine (e.g., 1103-1A) in the second language can be stored and retrieved to process a speech recognition of a spoken utterance in the second language, to generate an annotated output in the second language. The translated NLU engine 1103-1A, in this example, can further process the annotated output in the second language, e.g., by comparing the annotated output to one or more translated grammars (e.g., stored in the entries of the translated mapping table 191-1A, along with one or more translated intents to which the translated entries respectively correspond) in the second language, to identify an intent in the second language for the spoken utterance. Optionally or additionally, the translation engine 132 can use one or more translation models (e.g., translation model 1321-1, translation model 1321-3) to respectively translate the identified intent in the second language into one or more corresponding intents in the first language, and the fulfillment engine 1107 (or the cloud-based fulfillment engine 139) can select/determine an intent in the first language from the one or more corresponding intents in the first language, and cause, based on the selected/determined intent in the first language, performance of one or more responsive actions. Here, the one or more responsive actions can be, for example, one or more automated assistant actions (search information, control a third-party smart bulb to turn off light, etc.).

Optionally or additionally, using the 0.65 and 0.72 example above, when using a translation model (i.e., 1321-1) to automatically translate the identified intent in the second language into a corresponding intent in the first language, the translation model (i.e., 1321-1) can output a $1^{st}$ subsequent individual confidence score, and the $1^{st}$ subsequent individual confidence score can be utilized by the scoring engine 134 to adjust or modify the aforementioned translation score (to see whether the translation score still satisfies the translation threshold or not). As a non-limiting example, the $1^{st}$ subsequent individual confidence score may be 0.4, and the translation score can be modified to consider the $1^{st}$ subsequent individual confidence score (i.e., 0.4), along with the first individual confidence score (i.e., 0.65) and the third individual confidence score (i.e., 0.72), in a weighted manner (e.g., the translation score=weight 1×0.65+weight 2×0.72+weight 3×0.4, where weight 3 is smaller than weight 1 and weight 2). Optionally, the $1^{st}$ subsequent individual confidence score can optionally be further utilized to re-evaluate translation quality of the translation model 1321-1. Optionally or additionally, continuing to use the 0.65 and 0.72 example above, when using a translation model (e.g., 1321-3) to automatically translate the identified intent in the second language into a corresponding intent in the first language, the translation model (e.g., 1321-3) can output a $3^{rd}$ subsequent individual confidence score (e.g., 0.69), and the $3^{rd}$ subsequent individual confidence score can be utilized by the scoring engine 134 to adjust or modify the aforementioned translation score (to see whether the translation score still satisfies the translation threshold or not).

In various implementations, the grammars (in their entirety or alternatively, a portion thereof, that are stored in the translated mapping table 191-1A in FIG. 1B) and/or the corresponding intents (in their entirety or a portion thereof) in the second language can be processed using a language model trained in the second language to predict a natural language output and to output a corresponding language model measure. Alternatively or additionally, the language model trained in the second language can process one or more user queries received at the translated automated assistant, to generate natural language output(s) and to output a corresponding language model measure.

Figure 1D:
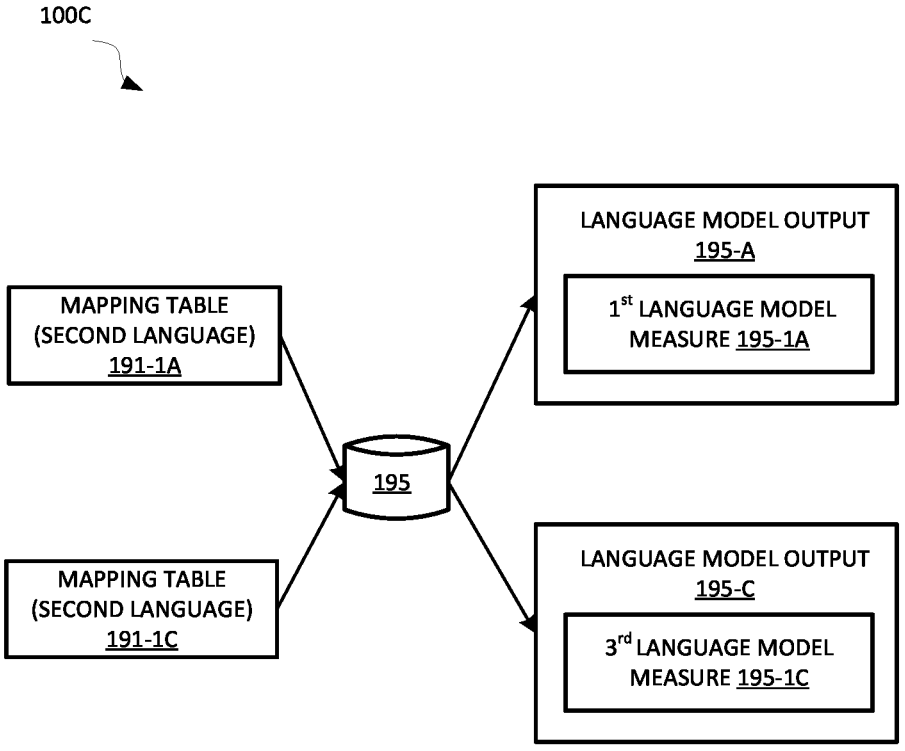
FIG. 1D depicts an example process flow that generates one or more language model measures by using a language model to process translated intents in FIG. 1A, in accordance with various implementations.

As a non-limiting example, FIG. 1D depicts a situation where a language model 195, of the ML model(s) 193, is used to process a translated mapping table 191-1A in the second language to generate a language model output 195-A, where the language model output 195-A can include a 1st language model measure 195-1A. Referring to FIG. 1D, the language model 195 can also be used to process a translated mapping table 191-1C in the second language to generate a language model output 195-C, where the language model output 195-C can include a 3rd language model measure 195-1C. Alternatively, instead of processing the translated mapping table 191-1A and/or the translated mapping table 191-1C, the language model 195 can be configured to process one or more grammars (second language) stored in the translated mapping table 191-1A to generate the 1st language model measure 195-1A, and the language model 195 can be configured to process one or more translated grammars (second language) stored in the translated mapping table 191-1C to generate the 3rd language model measure 195-1C. Alternatively or additionally, the language model 195 can be configured to process one or more translated grammars in the second language and speech recognition(s) of one or more user queries in the second language, to generate one or more natural language output and to output one or more language model measures. The present disclosure is not limited thereto.

In some implementations, the language model output 195-A can include a predicted intent in the second language (in case the language model 195 processes a translated grammar in the second language). Alternatively, the language model output 195-A can include a natural language output in the second language (in case the language model 195 processes a translated entry that contains a translated grammar and a correspondingly translated intent in the second language). Optionally, the language model output 195-A can further include the language model measure 195-1A, that indicates how well the predicted intent in the second language (or the natural language output in the second language) conforms to grammar rules (and/or other language rules such as spelling accuracy, punctuation, sentence structure, etc.) of the second language. Optionally, an individual application score of the first translation model 132-1 that evaluates an application of the first translation model 132-1 in automatically translating one or more components (e.g., the NLU engine 1103) of the customized automated assistant 110 can be determined/calculated using the $1^{st}$ individual translation score and the $1^{st}$ language model measure 195-1A.

Similarly, when the third translation model 132-3 generates the third individual confidence score (e.g., 0.72) that satisfies the predetermined threshold (e.g., 0.6) for a translated NLU engine 1103-1C, the mapping table (second language) 191-1C associated with the translated NLU engine 1103-1C can be processed using the language model 195 to obtain a language model output 195-C. Similarly, an individual application score of the third translation model 132-3 that evaluates an application of the third translation model 132-1 in automatically translating the NLU engine 1103 of the customized automated assistant 110 can be calculated using the $3^{rd}$ individual translation score and the $3^{rd}$ language model measure 195-1C. Optionally, the $1^{st}$ language model measure 195-1A and the $3^{rd}$ language model measure 195-1C can be aggregated to obtain an aggregated language model measure.

In various implementations, the individual confidence score(s), and the aggregated language model measure (or instead, the language model measures), can together be applied to determine an overall application score of using the translation engine 132 in automatically translating one or more components (e.g., the NLU engine 1103) of the client automated assistant 110 (in the first language). Optionally, an individual application score can be calculated for each of the translation models (132-1~132-N) to evaluate an application of a corresponding translation model (e.g., 132-1) in automatically translating the customized automated assistant 110 from the first language to the second language. For example, as mentioned previously, the individual application score of the first translation model 132-1 can be calculated using the $1^{st}$ individual translation score and the $1^{st}$ language model measure 195-1A. The overall score of the automatic translation can then be calculated considering the individual application scores (e.g., generated based on the individual confidence score and the corresponding language model measure) for each of the translation models (132-1~132-N). Optionally, the overall score can be further determined or modified by the scoring engine 134 by considering a BLEU score and/or other scores that evaluate the automatic translation enabled via the translation engine 132. This will be described subsequently in this disclosure.

Figure 1E:
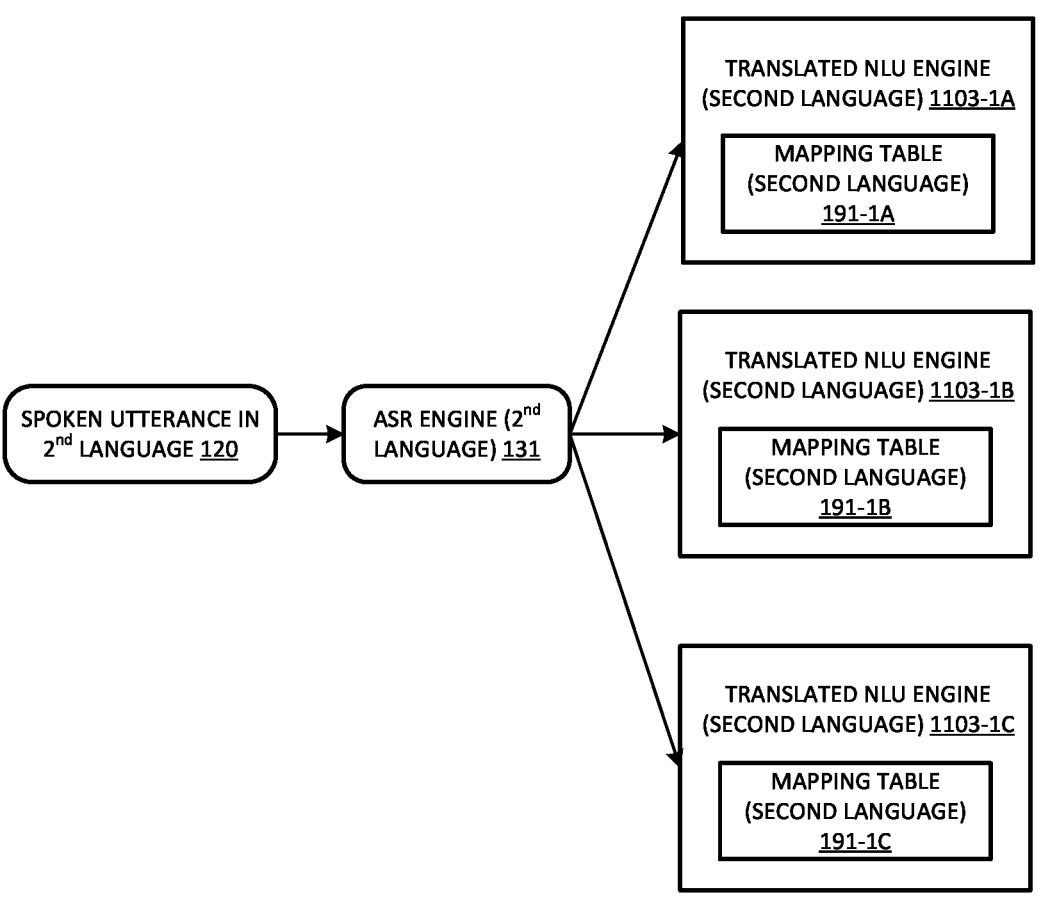
FIG. 1E depicts an example process flow that processes a spoken utterance in a new language using one or more translated components of the customized automated assistant in FIG. 1A, in accordance with various implementations.

In various implementations, in response to the overall score satisfying an automatic translation quality threshold, the customized automated assistant 110 can be enabled or allowed to respond to user input (e.g., spoken utterance or text input) in the second language, for example, by performing an action responsive to the user input. This can be implemented, for example, by first determining whether the cloud-based ASR engine 131 is capable of recognizing spoken utterance(s) in the second language. Referring to FIG. 1E, if the cloud-based ASR engine 131 is capable of recognizing spoken utterance(s) in the second language, the cloud-based ASR engine 131 can be used to process the user input (e.g., a spoken utterance 120 in the second language) to generate a speech recognition of the user input (audible) in the second language. If the cloud-based ASR engine 131 is not capable of recognizing spoken utterance(s) in the second language, an additional ASR engine capable of recognizing spoken utterance(s) in the second language can be retrieved over the cloud or be provided by the administrator computing device, to process the user input (audible) in the second language.

Enabling the customized automated assistant 110 to respond to user input in the second language can further include or be further implemented by: directing the speech recognition of the user input (generated by the cloud-based ASR engine 131) to the one or more translated components (e.g., the translated NLU engine 1103-1A in FIG. 1E) for identifying an intent in the second language for the user input. Optionally, enabling the customized automated assistant 110 to respond to user input in the second language can further include or be further implemented by: using the local fulfillment engine 1109 or the cloud-based fulfillment engine 139 to, based on the intent in the second language, cause performance of one or more responsive actions (e.g., one or more automated assistant actions such as searching the internet for "wetter", which is the German language for "weather"). Alternatively, when the one or more translated components of the customized automated assistant 110 includes a translated fulfillment engine (or a partially translated fulfillment engine) in the second language, the translated fulfillment engine can be used instead of the local fulfillment engine 1109 (or the cloud-based fulfillment engine 139) to process the intent in the second language, thereby causing performance of the one or more responsive actions.

Optionally, prior to enabling the customized automated assistant 110 to respond to user input in the second language (i.e., a language in which the customized automated assistant 110 is not configured to interact with users), a prompt (e.g., in the form of a visual button, a link, or selectable element) or message can be rendered to the developer or a user of the client computing device 11, for the developer (or the user) to determine whether or not to enable the customized automated assistant 110 to respond to user input in the second language.

In various implementations, after the customized automated assistant 110 is enabled (automatically or pursuant to developer's permission) to respond to user input in the second language, automatically translating one or more components (e.g., the customized NLU engine 1103) of the customized automated assistant 110 can continue to be performed periodically to determine whether the aforementioned overall score remains satisfying the automatic translation quality threshold. If the overall score falls below ("fails") the automatic translation quality threshold, the customized automated assistant 110 can be automatically disabled to respond to user input in the second language. Alternatively, when the overall score falls below ("fails") the automatic translation quality threshold, a prompt can be generated and rendered to the developer (and/or the user of the client computing device 11) to read as, e.g., "abnormal condition detected, would you like to disable auto-translation for the second language for a moment?" The developer or the user can then determine or confirm whether or not to disable the automatic translation function with respect to the second language. Optionally, when the developer is notified that the overall score falls below the automatic translation quality threshold, the developer can choose to manually or partially translate one or more of the components of the customized automated assistant 110, from the first language to the second language.

As a non-limiting example, referring to FIG. 1E, the customized automated assistant 110 (pre-configured by the developer to respond to spoken utterance(s) in the first language) is automatically enabled to respond to spoken utterance(s) 120 in the second language. Here, the customized automated assistant 110 can be so automatically enabled when the translated NLU engine 1103-1A (translated using the first translation model 132-1), the translated NLU engine 1103-1B (translated using the second translation model 132-2), and/or the translated NLU engine 1103-1C (translated using the third translation model 132-3) each provides satisfying performance (e.g., contributes to a corresponding application score based on which the overall score is determined to satisfy the automatic translation quality threshold). In this example, the customized automated assistant 110 can receive a spoken utterance (second language) 120 from a user of the client computing device 11, and process the spoken utterance 120 using the ASR engine 131 (in the second language) so that a speech recognition of the spoken utterance 120 is generated.

The customized automated assistant 110 can then process the speech recognition of the spoken utterance 120 using the translated NLU engine 1103-1A, the translated NLU engine 1103-1B, and/or the translated NLU engine 1103-1C, to determine an intent and/or parameter(s) in order to invoke a corresponding automated assistant action. In this example, whether the intent and/or parameter(s) determined by the first, second, and/or third translated NLU engines is able to invoke the corresponding automated assistant action can be determined. In response to the intent and/or parameter(s) determined by the first, second, and/or third translated NLU engines being unable to invoke the automated assistant action, the customized automated assistant 110 can be automatically disabled to respond to spoken utterance(s) in the second language, or a notification that automatic translation function for the second language has failed can be generated and rendered to the user of the client computing device 11 (and/or the developer). In this example, the no response (e.g., automated assistant action) or no appropriate response, of the customized automated assistant 110, to the spoken utterance 120 can reduce the overall score so that the reduced overall score falls below ("dissatisfy") the automatic translation quality threshold, which leads to the automatic disabling of the auto-translation function for the second language (or the automatic disabling of the auto-translation function after the developer is notified of the reduced overall score and selects to disable such auto-translation function). After the reduced overall score falls below ("dissatisfy") the automatic translation quality threshold, the customized automated assistant 110 can respond to subsequent user input (if any) using default content generated by the NL generator 137 (using for example, a content generating model 137A). The default content can be, for example, "Sorry, I can't handle that request, but I'm able to do it in English", if English is the first language in which the customized automated assistant 110 is configured to respond to.

Alternatively, in some implementations, instead of disabling the customized automated assistant 110 to respond to spoken utterance(s) in the second language after no automated assistant action is invoked for the first time, the customized automated assistant 110 can process a plurality of additional spoken utterances. In this case, if no automated assistant action (or no correct/appropriate automated assistant action) is invoked for a predefined number of additional spoken utterances out of the plurality of additional spoken utterances, the customized automated assistant 110 can then be automatically disabled to respond to any further spoken utterance in the second language received from the client computing device 11, or a notification that automatic translation function for the second language has failed can be generated and rendered to the developer and/or the user of the client computing device 11.

Alternatively, in some implementations, instead of being disabled after the predefined number of additional spoken utterances invoke no responsive action, the customized automated assistant 110 can be disabled to respond to spoken utterance(s) in the second language after a predefined period of time within which the customized automated assistant 110 receives no spoken utterance in the second language.

FIG. 2 is a flowchart illustrating an example method 200 for automatically translating a customized automated assistant, in accordance with various implementations. As shown in FIG. 2, in various implementations, the example method 200 includes: at block 201, accessing a customized automated assistant that includes one or more first language customized components (e.g., the NLU engine 1103 in FIG. 1A). Each of the one or more first language customized components may, for example, be configured based on developer inputs, in a first language. Optionally, the one or more first language customized components can be provided to enable the customized automated assistant to perform one or more automated assistant actions (e.g., generate a control signal to control a third-party device, cause a search result to be rendered, etc.) responsive to natural language input that is in the first language.

As a non-limiting example, the first language can be English, and the customized automated assistant is configured based on developer inputs from a developer to include one or more first language customized components in English. The one or more first language customized components in English can, for example, enable the customized automated assistant to turn on a smart TV in response to receiving a spoken utterance in English from a user of a computing device (at which the customized automated assistant is installed), saying, "Assistant, please turn on the TV". In this example, if alternatively or additionally, the user provides another spoken utterance in English, e.g., "Assistant, what time is it?", the customized automated assistant can access a local digital clock, or search the Internet for a search result. In this example, the information returned by the local digital clock or the search result can be used (e.g., by the NL generator 137) to generate natural language content (e.g., "current time is 3:15 pm"), where the natural language content can be rendered visually (or audibly) to the user.

Optionally, the one or more first language customized components can include one or more first language grammars (e.g., play <song>) and/or one or more first language intents (e.g., play song X using device or service Y) that map one or more first language representations of natural language inputs to one or more respective first language responsive actions (simply "first language actions"). As a non-limiting example, one of the one or more first language grammars can be in a form of "play <song>", and can map a first language representation (e.g., "please play the song called play that song" or "play 'play that song'") of natural language input (e.g., "Assistant, please play the song 'play that song'") to a first language action (e.g., stream the song named "play that song" using streaming service X). Here, the first language representation can be a recognition (e.g., speech recognition) of the natural language input (or a portion thereof, e.g., without considering the hotword "Assistant"). Alternatively, the first language representation can be in the form of the one first language grammar with or without one or more slots filled with corresponding slot values, e.g., "play <play that song>".

For instance, using the one first language grammar "play <song>", the first language representation (e.g., a speech recognition "I want to hear Dangerous", or "play <Dangerous>") of natural language input (e.g., "Assistant, I want to hear Dangerous) can be mapped to a first language intent ("play song" or "play song using streaming service X") and one or more first language parameters ("song: Dangerous"; "singer: MJ"). The first language intent and the one or more first language parameters here can be used to determine a corresponding first language action (e.g., streaming the song Dangerous via service X).

As another non-limiting example, an additional first language grammar, of the one or more first language grammars, can have a format of "turn on <device or service>". Such additional first language grammar can, for example, be used to map a first language representation (e.g., "turn on TV") of natural language input (e.g., "Hey Assistant, turn on the TV") to a first language action (e.g., turn on the smart TV).

As another example, the first language grammar(s) can map a first language representation (e.g., "[play song]<play that song><live>") of natural language input (e.g., "Assistant, I want to hear the live version of the song 'play that song'") to a first language action (e.g., stream the song "play that song" using streaming service X), and map another first language representation (e.g., [turn on]<TV>) of natural language input (e.g., "Hey Assistant, watch TV") to another first language action (e.g., turn on the smart TV). In this example, the first language representation can be in a format of: [intent/action]<parameter 1><parameter 2> . . . <parameter N>.

Optionally or additionally, if the first language grammar(s) find no first language action to which the first language representation (e.g., find <my cellphone>) of natural language input (e.g., "Assistant, where is my cellphone?") can map, a default first language action in the first language can be used as a response to the natural language input (e.g., "Assistant, where is my cellphone?"). For instance, the default first language action can be to render natural language output in the first language, such as, "Sorry, I am confused" or "Sorry, your request is beyond my capability.

In various implementations, the example method 200 can further include: at block 203, automatically translating the one or more first language customized components to one or more translated second language components. The one or more first language customized components here may refer to one or more components of the customized automated assistant that are configured by the developer in the first language ("default language"). The one or more translated second language components can be one or more components of the customized automated assistant in the second language that are translated from the one or more first language customized components. Here, the automatic translation of the one or more first language customized components to the one or more translated second language components can save computing resources and labor work of the developer in manually translating the one or more first language customized components, as well as saving any testing or correction needed to ensure a quality of the one or more translated second language components that are translated from the one or more first language customized components.

Optionally, the second language can be determined based on a region where a client device (e.g., the aforementioned "client computing device") having the customized automated assistant (e.g., 110) installed is located. For example, for a client device (having the customized automated assistant 110 installed) to be sold in Spain, and the customized automated assistant may be configured by the developer in Spanish (i.e., Spanish being the aforementioned first language). In this example, the aforementioned second language can be Castilian (i.e., a dialect of Spanish), or Catalan (i.e., a Romance language related to Castilian). Alternatively, the method 200 can be extended to translate the one or more first language (e.g., Spanish) customized components to one or more translated second language components (Castilian), and the one or more first language (e.g., Spanish) customized components to one or more translated third language components (Castilian), and the present disclosure is not limited thereto.

As another example, the first language can be Italian, and the second language can be Romanian based on the Romanian language being closely related to the Italian language. As a further example, the first language can be Spanish, and the second language can be Portuguese. The present disclosure here is not intended to be limiting.

Alternatively, the second language can be determined based on user selection from a plurality of supported languages. For instance, a user of the client device can be presented with a user interface that enables the user to select a language, in addition to the first language, that the user wants to interact with the customized automated assistant 110, and the selected language can be determined as the aforementioned second language.

Optionally, automatically translating the one or more first language customized components to the one or more corresponding translated second language components (block 203) can include: at block 2031, automatically translating, using a first language translation model or a multilingual translation model, the one or more first language grammars and/or the one or more first language intents (or alternatively, a mapping table in the first language, such as mapping table 191 in the first language) to one or more translated second language grammars (or alternatively, a translated mapping table in a second language). Here, the first language translation model can be trained to translate the first language to the second language, and/or translate the second language to the first language. The multilingual translation model can be trained to at least translate the first language to the second language (and/or vice versa).

Optionally, automatically translating the one or more first language customized components to the one or more corresponding translated second language components (block 203) can further include: at block 2033, generating a confidence measure (may also be referred to as "confidence score") that measures automatic translation of the one or more first language grammars in the first language to the one or more translated second language grammars in the second language. As a non-limiting example, the first language grammars in the first language can be stored in a mapping table in the first language that includes a plurality of mapping entries in the first language, where each mapping entry includes a respective first language grammar and an intent (and/or parameters for the intent) in the first language that corresponds to the respective first language grammar. In this example, an individual confidence score can be generated when the aforementioned first language translation model (or the multilingual translation model) translates a respective first grammar in the first language to a translated first grammar in the second language. As an alternative, the individual confidence score can be generated when the aforementioned first language translation model (or the multilingual translation model) translates a respective mapping entry, of the one or more mapping entries of the mapping table in the first language, to a corresponding mapping entry in the second language. Optionally, the generated mapping entries in the second language can form a translated mapping table. Optionally, the aforementioned translation score can be generated based on the one or more individual confidence scores provided herein.

Optionally, automatically translating the one or more first language customized components to the one or more corresponding translated second language components can be performed in response to detection of a triggering event. As a non-limiting example, the triggering event can be, for example, the customized automated assistant receives a predefined number of spoken utterances in the second language. As another non-limiting example, the triggering event can be a predefined time (e.g., the first day of each month). As a further non-limiting example, the triggering event can be an upgrade or modification of the customized automated assistant by the developer. Here, the upgrade or modification can include, for example, a change by the developer to add an additional ML model to the one or more of the ML models 193, a change by the developer to add or replace a hotword (or invoking phrase) in the first language that invokes the customized automated assistant, and/or a change by the developer to add a third language as an additional default language to which the customized automated assistant can respond (along with the first language originally configured by the developer as a default language to which the customized automated assistant can respond). There are also other upgrades or modifications that the developer can apply to the customized automated assistant, which are not limited to examples provided above.

In various implementations, the example method 200 can optionally further include: at block 205, determining, based on the one or more translated second language grammars and using a language model trained in the second language, one or more language model measures for the one or more translated second language grammars. As a non-limiting example, the language model trained in the second language can be applied to process one or more natural language output (or one or more translated intents) generated respectively, based on one or more translated second language grammars and/or one or more translated second language intents, to output one or more language model measures for the one or more natural language outputs. The one or more language model measures can be used to generate an aggregated language model measure. The aggregated language model measure may indicate whether grammar rules, spellings, and/or order of word(s) or phrase(s) in the natural language output(s) are correct or appropriate.

In various implementations, the example method 200 can optionally include: at block 207, determining, based on an intent in the second language ("a translated second language intent") translated from a first language intent and a database of ground truth intents in the second language that correspond to the first language intent, a BLEU score for the intent in the second language. Here, the BLEU score does not consider whether word(s) or phrase(s) in the intent is spelled or arranged correctly, but can indicate a matching degree between word(s)/phrase(s) in the intent in the second language and word(s)/phrase(s) in the ground truth intents in the second language. For example, the BLEU score can be approximately 0.64, indicating a satisfying match between the intent in the second language and the ground truth intents in the second language.

In various implementations, the example method 200 can further include: at block 209, generating, based on the individual confidence scores, an overall score that measures an overall performance of the one or more translated second language components.

Alternatively, at block 209, the example method 200 can include: generating, based on the individual confidence scores and/or the language model measure, the overall score that measures the overall performance of the one or more translated second language components. Alternatively, at block 209, the example method 200 can include: generating, based on the individual confidence scores, the language model measure, and/or the BLEU score, an overall score that measures an overall performance of the one or more translated second language components.

In various implementations, the example method 200 can include: at block 211A, in response to the overall score satisfying an automatic translation quality threshold, automatically enabling the customized automated assistant for performing the one or more automated assistant actions responsive to natural language input that is in the second language. Performing the one or more automated assistant actions responsive to the natural language input that is in the second language can be implemented using the translated second language components.

In various implementations, the example method 200 can alternatively include: at block 211B, in response to the overall score satisfying the automatic translation quality threshold, generating a first notification that suggests the one or more translated second language components are ready to enable auto-transition from the first language to the second language. The first notification can be transmitted to the developer for the developer to confirm whether to enable the usage of the one or more translated second language components, for the customized automated assistant to respond to spoken utterance(s) in the second language. Optionally or additionally, at block 211B, a second notification that suggests enabling of the customized automated assistant in responding to spoken utterance(s) in the second language can be generated and rendered to a user of a device at which the customized automated assistant is installed. The user can enable the customized automated assistant in responding to spoken utterance(s) in the second language, so that an automated assistant action can be performed (or natural language output in the second language can be rendered) in response to the spoken utterance(s) in the second language.

FIG. 3 is a flowchart illustrating an example method 300 for utilizing an automatically translated automated assistant in user interaction, in accordance with various implementations. As shown in FIG. 3, the example method 300 includes: at block 301, receiving, via a customized automated assistant having one or more components translated from a first language to a second language, a spoken utterance in the second language, where the customized automated assistant is installed or accessible via a client device. As a non-limiting example, the first language can be English, and the second language can be Spanish. In this example, the one or more components can include, for example, a plurality of grammars (e.g., <weather> today) in English that are respectively mapped to a plurality of intents or responsive actions (e.g., "search Internet for weather today"), where the responsive action ("search Internet for weather today") can be identified or invoked using an intent (e.g., "search internet") in English and/or corresponding parameters (e.g., "weather" "today") in English. The responsive action here can refer to an automated assistant action performed by the customized automated assistant in response to user input (audio or textual).

The example method 300 includes: at block 303, performing, via the customized automated assistant having one or more components translated from a first language to a second language, an automated assistant action responsive to the spoken utterance in the second language.

Figure 4A:
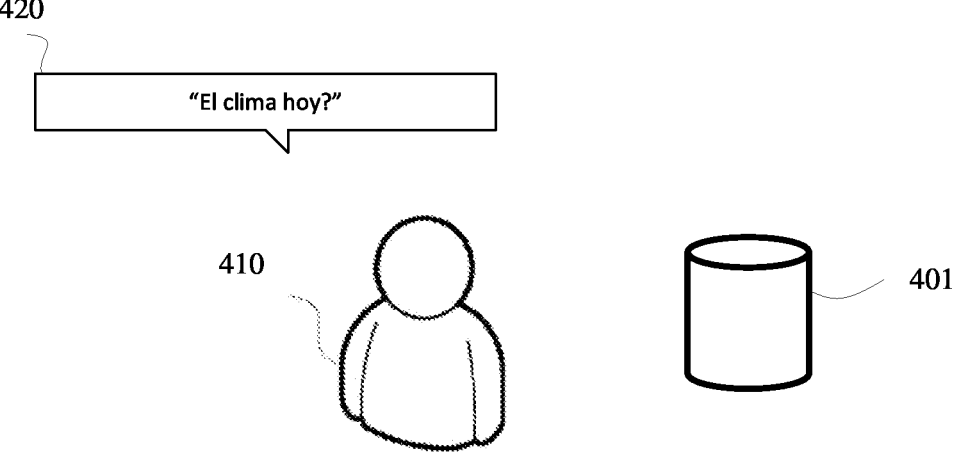
FIG. 4A illustrates a scenario in which a customized automated assistant provides no response to a spoken utterance in a new language, prior to the customized automated assistant being automatically translated to respond in the new language, in accordance with various implementations.

In view of the example method 300 above and now referring to FIG. 4A, prior to having the one or more components in English translated to one or more translated components in Spanish, the customized automated assistant (e.g., installed at a client device 401 in FIG. 4A) may not respond to a spoken utterance 420 (e.g., "El clima hoy?" in Spanish), or may respond by causing the client device 401 to perform a default action. For example, detecting that the client device 401 is located within a region with most population speaking English, the customized automated assistant haven't had the one or more components translated from English to Spanish can, in response to receiving the spoken utterance 420, cause the client device 401 to deliver a red light using a physical portion of the client device, to deliver a warning beep sound, or to deliver a default message including an error/warning symbol (or natural language indicating there is an error, e.g., "error!").

Figure 4B:
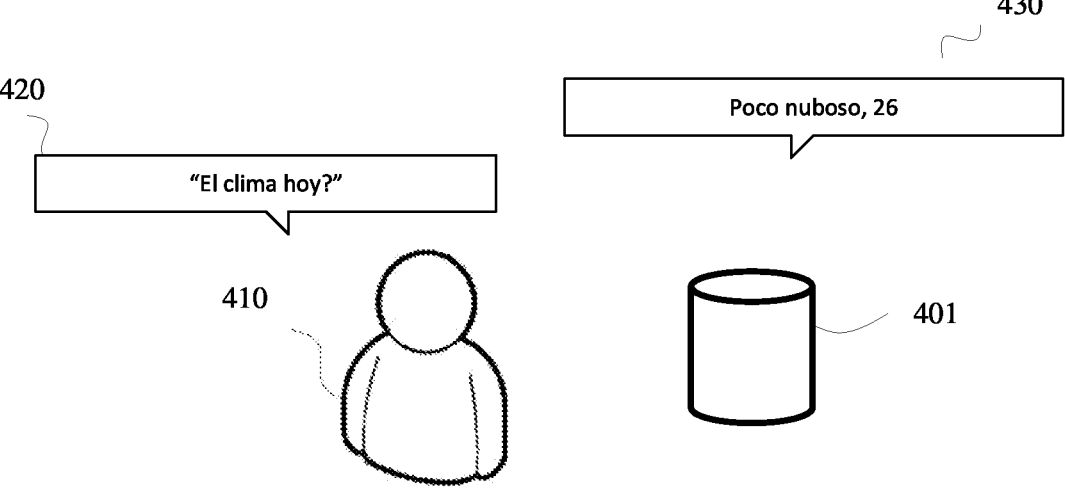
FIG. 4B illustrates a scenario, after the scenario of FIG. 4A and after the customized automated assistant has been translated to respond in the new language, in which the customized automated assistant responds in the new language, in accordance with various implementations.

The client device 401 may then be detected to be located at a different region where Spanish is a more popular language. In response to detecting that the client device 401 is located at the different region (e.g., Los Angeles), the customized automated assistant 410 may have the one or more components originally configured in English being translated to one or more translated components that are in Spanish. In this case, referring to FIG. 4B, the customized automated assistant 410 haven't had the one or more components translated from English to Spanish can, in response to receiving the spoken utterance 420 (e.g., "El clima hoy?" in Spanish), identify and perform a responsive automated assistant action (e.g., search the internet for <El clima hoy><Los Ángeles>). Based on performing the search for "El clima hoy in Los Ángeles", the customized automated assistant 410 can obtain a reply 430 (e.g., "Poco nuboso, 26°", meaning "Light cloudy, 26°" in English) to the spoken utterance 420 and cause the client device 401 to audibly or visually render the reply to the user of the client device 401.

FIGS. 5A, 5B, and 5C are flowcharts illustrating another example method 500 for automatically translating a customized automated assistant, in accordance with various implementations. As shown in FIG. 5A, in various implementations, the example method 500 includes: at block 501, detecting a triggering event that triggers automatic translation of one or more components of an automated assistant, where the one or more components are configured by a developer in a first and a second primary languages. The automated assistant here can be a customized automated assistant configured by a developer to: (a) respond to user input (spoken utterance or textual input) in the first primary language; and/or (b) respond to user input in a second primary language. As a non-limiting example, the first primary language can be English, the second primary language can be French, and automatic translation of one or more components of an automated assistant can include: (1) automatic translation of the one or more components of the automated assistant from the first primary language (e.g., English) to a secondary language (e.g., Spanish), and (2) automatic translation of the one or more components of the automated assistant from the second primary language (e.g., French) to the secondary language (e.g., Spanish).

In various implementations, the example method 500 can further include: at block 503, determining a translation score ("translation measure" or "translation confidence measure") for the automatic translation of the one or more components of the automated assistant. In some implementations, referring to FIG. 5B, determining the translation score for the automatic translation (block 503) can include: at block 5031, translating (e.g., by using a first translation model) the one or more components of the automated assistant in the first primary language to generate (1a) one or more translated components in the secondary language and (1b) a first confidence score, and/or translating the one or more components of the automated assistant in the second primary language using a second translation model to generate (2a) one or more additional translated components in the secondary language and (2b) a second confidence score. Here, the first translation model can be a machine translation model trained to translate natural language content from the first primary language to the secondary language, and the second translation model can be a different machine translation model trained to translate natural language content from the second primary language to the secondary language. Optionally, the first translation model can be the same as the second translation model, which can be a multilingual machine translation model trained to at least translate the first primary language to the secondary language and translate the second primary language to the secondary language.

Optionally, the one or more components can include a ASR model customized to recognize one or more hot phrases (e.g., a term representing a name of the automated assistant) in both the first and second primary languages as hotwords that invoke the automated assistant to respond to user input. Alternatively or additionally, the one or more components can include: a NLU engine storing first and second primary language grammars and/or other script in the first and second primary languages. Alternatively or additionally, the one or more components can include one or more natural language output (e.g., a default natural language output such as "Sorry, I don't understand"), and the present disclosure does not intend to be limiting. Optionally, "Sorry, I don't understand" can be translated using the translation engine 132 into "Lo siento, no entiendo" (which means "I'm sorry, I don't understand") in the secondary language (e.g., Spanish), for rendering to the user.

In some implementations, referring to FIG. 5B, determining the translation score for the automatic translation (block 503) can further include: at block 5033, determining the translation score, based on the first confidence score (that is generated by the first translation model in translating the one or more components from the first primary language to the secondary language) and based on the second confidence score (that is generated by the second translation model in translating the one or more components from the second primary language to the secondary language). As a non-limiting example, the first confidence score can be approximately 0.61 indicating a satisfying translation quality of using the first translation model to translate from the first primary language to the secondary language, and the second confidence score can be approximately 0.29 indicating an unsatisfying translation quality of using the second translation model to translate from the second primary language to the secondary language. In this example, the first confidence score can be selected as the overall score (i.e., 0.61) for the automatic translation that translates the one or more components into the secondary language. Alternatively, another computing algorithm can be applied to compute the overall score using the first and second individual confidence scores, and the present disclosure is not intended to be limiting.

In various implementations, the example method 500 can optionally include: at block 505, determining a language model measure using the one or more translated components in the secondary language. In some implementations, determining the language model measure can include: at block 5051, processing the one or more translated components (or a portion thereof) in the secondary language using a language model trained in the secondary language, where the language model measure can be determined based on processing the one or more translated components. The one or more translated components can include, for example, one or more translated grammars (and/or one or more translated intents) in the secondary language that are translated from one or more grammars (and/or one or more intents) in the first and second primary languages.

Optionally, the language model measure can be determined using the language model trained in the secondary language to process a single translated grammar in the secondary language. Optionally, the language model measure can be determined based on a plurality of individual language model measures generated by using the language model trained in the secondary language to respectively process a plurality of translated grammars in the secondary language.

In various implementations, the example method 500 can optionally include: at block 507, determining a BLEU measure using the one or more translated components in the secondary language. In some implementations, referring to FIG. 5C, determining the BLEU measure (block 507) can include: at block 5071, retrieving one or more translated grammars and/or translated intents (both in the secondary language) from the one or more translated components; at block 5073, retrieving one or more ground truth grammars and/or intents in the secondary language that respectively correspond to the one or more translated grammars and/or translated intent in the secondary language; and at block 5075, determining the BLEU measure by matching the one or more translated grammars in the secondary language with the one or more ground truth grammars in the secondary language and/or by matching the one or more translated intents in the secondary language with the one or more ground truth intents in the secondary language.

In various implementations, the example method 500 can further include: at block 509, determining an overall measure ("overall score") based on the translation score, the language model measure, and/or the BLEU measure. For example, the overall measure can be determined based solely on the translation score. As another example, the overall measure can be determined based on the translation measure and the language model measure. As a further non-limiting example, the overall measure can be determined based on the translation measure and the BLEU measure. As an additional non-limiting example, the overall measure can be determined based on the translation measure, the language model measure, and the BLEU measure.

In various implementations, the example method 500 can further include: at block 511, determining whether the overall measure satisfies an automatic translation quality threshold (a numerical value such as 0.6). In various implementations, the example method 500 can further include: at block 513, in response to determining that the overall measure satisfies the automatic translation quality threshold, enabling the automated assistant to perform one or more responsive actions (e.g., automated assistant actions) responsive to natural language input that is in the secondary language. In some implementations, enabling the automated assistant can be implemented automatically without the need to seek permission from the developer or a user of the client device. In some other implementations, enabling the automated assistant can include: at block 5131, forwarding a suggestion to the developer that suggests the developer to enable the automated assistant to perform one or more automated assistant actions responsive to natural language input that is in the secondary language; and at block 5133, in response to receiving user permission to enable the automated assistant to perform one or more automated assistant actions responsive to natural language input that is in the secondary language, enabling the automated assistant to perform the one or more automated assistant actions responsive to the natural language input that is in the secondary language.

In various implementations, the example method 500 can further include: at block 515, disabling the automated assistant to perform the one or more automated assistant actions responsive to the natural language input in the secondary language. For example, the automated assistant can be disabled to perform the one or more automated assistant actions responsive to the natural language input in the secondary language, if the overall measure is detected to fall below the automatic translation quality threshold after automatic translation is performed (e.g., periodically pursuant to periodic setting). The disabling process can also be performed in response to occurrence of other event(s), which is described previously, and repeated descriptions are omitted herein.

Optionally, in some implementations, the above-described auto-translation process can be applied or adapted to automatically translate one or more components of an automated assistant customized by a developer from the first primary language (e.g., English) to the second primary language (e.g., French), and an overall measure can be determined based on a translation measure, a language model measure, and/or a BLEU measure using the one or more translated components in the second primary language. In this case, the developer can be notified if the overall measure is abnormal. It's noted that in these implementations, if the BLEU measure is calculated, the one or more intents in the second primary language (i.e., French) configured by the developer can be used as the ground truth intents to calculate the BLEU measure when compared (or matched) with one or more translated intents in the second primary language that are translated from one or more intents in the first primary language. Here, the one or more intents in the first primary language, like the one or more intents in the second primary language, are configured by the developer.

Figure 6:
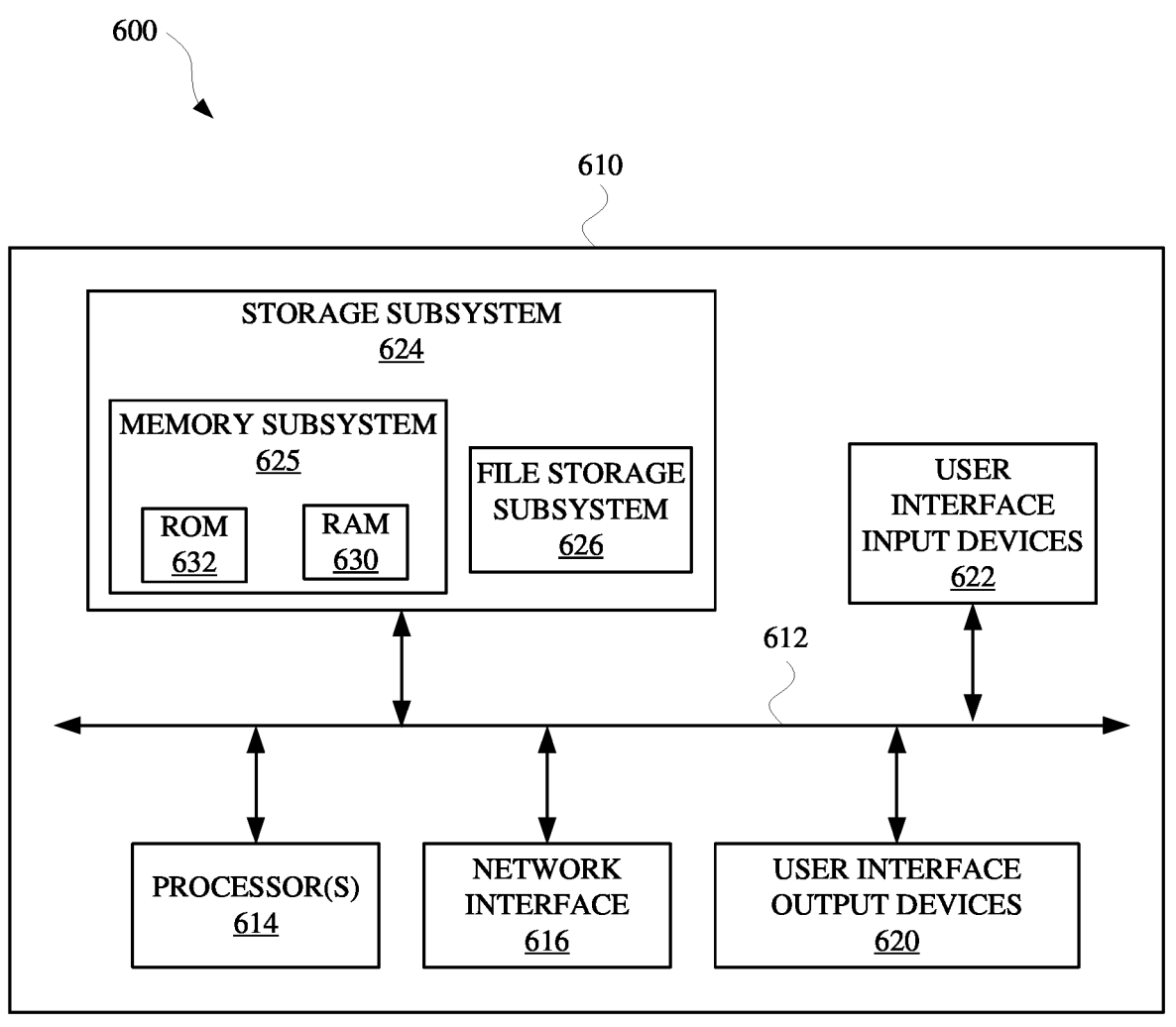
FIG. 6 illustrates an example architecture of a computing device, in accordance with various implementations.

FIG. 6 is a block diagram of an example computing device 610 that may optionally be utilized to perform one or more aspects of techniques described herein. In some implementations, one or more of a client computing device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIG. 1A.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple buses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

Different features of the examples can be combined or interchanged, unless they are not combinable nor interchangeable.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, and/or method described herein. In addition, any combination of two or more such features, systems, and/or methods, if such features, systems, and/or methods are not mutually inconsistent, is included within the scope of the present disclosure.

In various implementations, a method implemented by one or more processors is provided, and includes: accessing a customized automated assistant that includes one or more first language customized components, each of the first language customized components generated based on developer inputs, in a first language, and provided to enable the customized automated assistant to perform one or more automated assistant actions responsive to natural language input that is in the first language, where the first language customized components comprise one or more first language grammars in the first language; and automatically translating, using one or more translation models, the first language customized components to translated second language components. The automatically translating in these implementations can include: automatically translating the one or more first language grammars in the first language to one or more translated second language grammars in a second language, and determining, based on output generated using the one or more translation models during the automatically translating, one or more confidence measures that each reflect predicted confidence of a corresponding one of the translated second language grammars from the automatically translating.

In some implementations, the method further includes: determining, based on the one or more translated second language grammars and using a language model trained for the second language, one or more language model measures; determining, based at least on the one or more individual confidence measures and the one or more language model measures, an overall score for the translated second language components; and in response to the overall score satisfying an automatic translation quality threshold: automatically enabling the customized automated assistant to respond to user input that is in the second language, wherein the customized automated assistant uses the translated second language components to process and respond to the user input that is in the second language.

In some implementations, the first language customized components further include one or more first language intents. In this case, automatically translating, using the one or more translation models, the first language customized components to the translated second language components can include: automatically translating one or more first language intents in the first language to one or more translated second language intents in the second language; and determining, based on output generated using the one or more translation models during the automatically translating, one or more additional confidence measures that each reflect the predicted confidence of a corresponding one of the one or more translated second language intents from the automatically translating. In some implementations, optionally, determining the overall score for the translated second language components can be further based on the one or more additional individual confidence measures.

In some implementations, determining, based on the one or more translated second language grammars and/or based on the one or more translated second language intents in the second language, a BLEU score (or other model-based metric such as a BLEURT metric), wherein the overall score for the translated second language components is determined based further on the BLEU score (or the other model-based metric, e.g., BLEURT metric). In these implementations, determining the BLEU score can include: determining, based on the one or more translated second language intents in the second language and a database of ground truth intents in the second language that correspond to the one or more first language intents in the first language, the BLEU score for the one or more translated second language intents.

In some implementations, automatically translating the first language customized components to the translated second language components can be performed in response to a triggering event, and the triggering event can include receiving a spoken utterance in the second language, receiving a predetermined number of spoken utterances in the second language, receiving an update to the customized automated assistant, or reaching a periodic temporal event.

In some implementations, the first language is a widely-used language, a default language, or an already supported language. In some implementations, the second language can be determined based on a location of a device at which the customized automated assistant is at least partially installed.

In some implementations, the method can further include: determining an updated overall score for the translated second language components; and in response to the updated overall score failing to satisfy the automatic translation quality threshold, automatically disabling the customized automated assistant to respond to user input in the second language.

In some implementations, the one or more first language grammars can include a first language grammar entry that maps a given natural language input in the first language to a given intent and/or to a given responsive action.

In various implementations, a method implemented by one or more processors is provided, and includes: accessing a customized automated assistant that includes one or more first language customized components, each of the first language customized components generated based on developer inputs of a developer, in a first language, and provided to enable the customized automated assistant to perform one or more automated assistant actions responsive to natural language input that is in the first language. The first language customized components in these implementations can include one or more first language grammars and/or one or more first language intents respectively corresponding to the one or more first language grammars, where the one or more first language grammars can include a first language grammar that maps a natural language input in the first language to a first language intent in the first language, to determine a responsive action of the customized automated assistant responsive to the natural language input.

The method in these various implementations can further include: automatically translating, using one or more translation models, the first language customized components to translated second language components, which includes: automatically translating the one or more first language grammars in the first language to one or more translated second language grammars in a second language, where the one or more translation models generate one or more individual confidence measures after automatically translating the one or more first language grammars.

The method in these various implementations can further include: determining, based on the one or more translated second language grammars and using a language model trained in the second language, one or more language model measures; and determining, based at least on the one or more individual confidence measures and the one or more language model measures, an overall score for the translated second language components. The method in these various implementations can further include: in response to the overall score satisfying an automatic translation quality threshold, generating a notification that suggests the developer to enable the customized automated assistant to respond to user input in the second language, where the customized automated assistant uses the translated second language components to process and respond to the user input in the second language; and in response to receiving permission from the developer to enable the customized automated assistant to respond to the user input in the second language, enabling the customized automated assistant to respond to the user input in the second language.

In some implementations, automatically translating, using the one or more translation models, the first language customized components to the translated second language components further includes: automatically translating the one or more first language intents in the first language to one or more translated second language intents in the second language, wherein the one or more translation models generate one or more additional individual confidence measures after automatically translating the one or more first language intents.

In some implementations, the overall score for the translated second language components is determined based further on the one or more additional individual confidence measures.

In some implementations, the method further includes: determining, based on the one or more translated second language grammars and/or based on the one or more translated second language intents in the second language, a BLEU score or other model-based metric(s), wherein the overall score for the translated second language components is determined based further on the BLEU score or other model-based metric(s). In some implementations, determining the BLEU score includes: determining, based on the one or more translated second language intents in the second language and a database of ground truth intents in the second language that correspond to the one or more first language intents in the first language, the BLEU score for the one or more translated second language intents.

In some implementations, automatically translating the first language customized components to the translated second language components is performed in response to a triggering event, and the triggering event includes receiving a spoken utterance in the second language, receiving a predetermined number of spoken utterances in the second language, receiving an update to the customized automated assistant, or reaching a periodic temporal event.

In some implementations, the first language is a widely-used language, and wherein the second language is determined based on a location of a device at which the customized automated assistant is at least partially installed.

In some implementations, the method further includes: determining an updated overall score for the translated second language components; and in response to the updated overall score failing to satisfy the automatic translation quality threshold, automatically disabling the customized automated assistant to respond to user input in the second language.

In various implementations, a system is provided and includes: memory storing instructions; and one or more processors, executing the instructions stored in the memory, to: access a customized automated assistant that includes one or more first language customized components. Each of the first language customized components in these various implementations can be generated based on developer inputs, in a first language, and is provided to enable the customized automated assistant to perform one or more automated assistant actions responsive to natural language input that is in the first language. In various implementations, the first language customized components include one or more first language grammars and/or one or more first language intents respectively corresponding to the one or more first language grammars, where the one or more first language grammars includes a first language grammar that maps a natural language input in the first language to a first language intent in the first language, to determine a responsive action of the customized automated assistant responsive to the natural language input.

In some implementations, the one or more processors of the system, executing the instructions stored in the memory, further to: automatically translate, using one or more translation models, the first language customized components to translated second language components, including automatically translating the one or more first language grammars in the first language to one or more translated second language grammars in a second language, where the one or more translation models generate one or more individual confidence measures after automatically translating the one or more first language grammars; determine, based on the one or more translated second language grammars and using a language model trained in the second language, one or more language model measures; determine, based at least on the one or more individual confidence measures and the one or more language model measures, an overall score for the translated second language components; and in response to the overall score satisfying an automatic translation quality threshold, automatically enable the customized automated assistant to respond to user input in the second language, wherein the customized automated assistant uses the translated second language components to process and respond to the user input in the second language.

In some implementations, the one or more translation models include a machine translation model trained in translating from the first language to the second language.

In some implementations, the one or more translation models include a multi-language machine translation model trained in at least translating from the first language to the second language. In these implementations, automatically translate, using the one or more translation models, the first language customized components to the translated second language components includes: automatically translate, using the multi-language machine translation model, the first language customized components to the translated second language components.

In various implementations, a method implemented by one or more processors is provided, and includes: accessing a customized automated assistant that includes one or more first language customized components, each of the first language customized components generated based on developer inputs, in a first language, and provided to enable the customized automated assistant to perform one or more automated assistant actions responsive to natural language input that is in the first language, where the first language customized components comprise a first language grammar that maps first language representations of natural language inputs to corresponding first language actions; automatically translating, using one or more translation models, the first language customized components to translated second language components, including automatically translating the first language grammar in the first language to a translated second language grammar in a second language, wherein the automatically translating generates a corresponding translation confidence measure for each of multiple translations during the automatically translating; determining, based on the translated second language grammar and using a language model for the second language, corresponding language model measures for the second language grammar; determining, based on the intent in the second language and a database of ground truth intents in the second language that correspond to the first intent in the first language, a BLEU model-based score for the intent in the second language; generating, based on the corresponding translation confidence measures, the corresponding language model measures, and BLEU mode-based score, an overall measure for the intent in the second language; and in response to the overall score satisfying a threshold, automatically enabling the customized automated assistant for performing the one or more automated assistant actions responsive to natural language input that is in the second language, performing the one or more automated assistant actions responsive to natural language input that is in the second language comprising using the translated second language components.

What is claimed is:

1. A method implemented by one or more processors, the method comprising:

accessing a customized automated assistant that includes one or more first language customized components, each of the first language customized components generated based on developer inputs, in a first language, and provided to enable the customized automated assistant to perform one or more automated assistant actions responsive to natural language input that is in the first language,
wherein the first language customized components comprise one or more first language grammars in the first language;

automatically translating, using one or more translation models, the first language customized components to translated second language components, including:
automatically translating the one or more first language grammars in the first language to one or more translated second language grammars in a second language, and
determining, based on output generated using the one or more translation models during the automatically translating, one or more individual confidence measures that each reflect predicted confidence of a corresponding one of the translated second language grammars from the automatically translating;

determining, based on the one or more translated second language grammars and using a language model trained for the second language, one or more language model measures;

determining, based at least on the one or more individual confidence measures and the one or more language model measures, an overall score for the translated second language components;

determining whether the overall score satisfies an automatic translation quality threshold;

in response to determining that the overall score satisfies the automatic translation quality threshold:
automatically enabling the customized automated assistant to respond to user input that is in the second language, wherein the customized automated assistant uses the translated second language components to process and respond to the user input that is in the second language; and in response to determining that the overall score fails to satisfy the automatic translation quality threshold:
preventing the customized automated assistant from being automatically enabled to respond to second language input.

2. The method of claim 1, wherein the first language customized components further comprise one or more first language intents and wherein automatically translating, using the one or more translation models, the first language customized components to the translated second language components further includes:

automatically translating one or more first language intents in the first language to one or more translated second language intents in the second language; and determining, based on output generated using the one or more translation models during the automatically translating, one or more individual additional confidence measures that each reflect the predicted confidence of a corresponding one of the one or more translated second language intents from the automatically translating.

3. The method of claim 2, wherein determining the overall score for the translated second language components is further based on the one or more additional individual confidence measures.

4. The method of claim 1, further comprising:

determining, based on the one or more translated second language grammars and/or based on the one or more translated second language intents in the second language, a BLEU score, wherein the overall score for the translated second language components is determined based further on the BLEU score.

5. The method of claim 4, wherein determining the BLEU score comprises:

determining, based on the one or more translated second language intents in the second language and a database of ground truth intents in the second language that correspond to the one or more first language intents in the first language, the BLEU score for the one or more translated second language intents.

6. The method of claim 2, further comprising:

determining, based on the one or more translated second language grammars and/or based on the one or more translated second language intents in the second language, a model-based metric, wherein the overall score for the translated second language components is determined based further on the model-based metric.

7. The method of claim 1, wherein automatically translating the first language customized components to the translated second language components is performed in response to a triggering event, and wherein the triggering event includes receiving a spoken utterance in the second language, receiving a predetermined number of spoken utterances in the second language, receiving an update to the customized automated assistant, or reaching a periodic temporal event.

8. The method of claim 1, wherein the first language is an already supported language, and wherein the second language is determined based on a location of a device at which the customized automated assistant is at least partially installed.

9. The method of claim 1, further comprising:

determining an updated overall score for the translated second language components; and in response to the updated overall score failing to satisfy the automatic translation quality threshold, automatically disabling the customized automated assistant to respond to user input in the second language.

10. The method of claim 1, wherein the one or more first language grammars include a first language grammar entry that maps a given natural language input in the first language to a given intent and/or to a given responsive action.

11. A method implemented by one or more processors, the method comprising:

accessing a customized automated assistant that includes one or more first language customized components, each of the first language customized components generated based on developer inputs of a developer, in a first language, and provided to enable the customized automated assistant to perform one or more automated assistant actions responsive to natural language input that is in the first language, wherein the first language customized components comprise one or more first language grammars and/ or one or more first language intents respectively corresponding to the one or more first language grammars, and wherein the one or more first language grammars include a first language grammar that maps a natural language input in the first language to a first language intent in the first language, to determine a responsive action of the customized automated assistant responsive to the natural language input;

automatically translating, using one or more translation models, the first language customized components to translated second language components, including automatically translating the one or more first language grammars in the first language to one or more translated second language grammars in a second language, wherein the one or more translation models generate one or more individual confidence measures after automatically translating the one or more first language grammars;

determining, based on the one or more translated second language grammars and using a language model trained in the second language, one or more language model measures;

determining, based at least on the one or more individual confidence measures and the one or more language model measures, an overall score for the translated second language components;

determining whether the overall score satisfies an automatic translation quality threshold in response to determining the overall score satisfies the automatic translation quality threshold:

generating a notification that suggests the developer to enable the customized automated assistant to respond to user input in the second language, wherein the customized automated assistant uses the translated second language components to process and respond to the user input in the second language; and in response to receiving permission from the developer to enable the customized automated assistant to respond to the user input in the second language, enabling the customized automated assistant to respond to the user input in the second language; and in response to determining the overall score fails to satisfy the automatic translation quality threshold:

preventing the generation of the notification that suggests the developer to enable the customized automated assistant to respond to user input in the second language.

12. The method of claim 11, wherein automatically translating, using the one or more translation models, the first language customized components to the translated second language components further includes:

automatically translating the one or more first language intents in the first language to one or more translated second language intents in the second language, wherein the one or more translation models generate one or more additional individual confidence measures after automatically translating the one or more first language intents.

13. The method of claim 12, wherein the overall score for the translated second language components is determined based further on the one or more additional individual confidence measures.

14. The method of claim 12, further comprising:

determining, based on the one or more translated second language grammars and/or based on the one or more translated second language intents in the second language, a BLEU score, wherein the overall score for the translated second language components is determined based further on the BLEU score.

15. The method of claim 14, wherein determining the BLEU score comprises:

determining, based on the one or more translated second language intents in the second language and a database of ground truth intents in the second language that correspond to the one or more first language intents in the first language, the BLEU score for the one or more translated second language intents.

16. The method of claim 11, wherein automatically translating the first language customized components to the translated second language components is performed in response to a triggering event, and wherein the triggering event includes receiving a spoken utterance in the second language, receiving a predetermined number of spoken utterances in the second language, receiving an update to the customized automated assistant, or reaching a periodic temporal event.

17. The method of claim 11, wherein the first language is an already supported language, and wherein the second language is determined based on a location of a device at which the customized automated assistant is at least partially installed.

18. The method of claim 11, further comprising:

determining an updated overall score for the translated second language components; and in response to the updated overall score failing to satisfy the automatic translation quality threshold, automatically disabling the customized automated assistant to respond to user input in the second language.

19. A method implemented by one or more processors, the method comprising:

accessing a customized automated assistant that includes one or more first language customized components, each of the first language customized components generated based on developer inputs, in a first language, and provided to enable the customized automated assistant to perform one or more automated assistant actions responsive to natural language input that is in the first language, wherein the first language customized components comprise a first language grammar that maps first language representations of natural language inputs to corresponding first language actions;

automatically translating, using one or more translation models, the first language customized components to translated second language components, including automatically translating the first language grammar in the first language to a translated second language grammar in a second language, wherein the automatically translating generates a corresponding translation confidence measure for each of multiple translations during the automatically translating;

determining, based on the translated second language grammar and using a language model for the second language, corresponding language model measures for the second language grammar;

determining, based on the translated second language grammar in the second language and a database of ground truth grammars in the second language that correspond to the first language grammar in the first language, a BLEU score for the translated second language grammar in the second language;

generating, based on the corresponding translation confidence measures, the corresponding language model measures, and the BLEU score, an overall score for the translated second language grammar in the second language; and determining whether the overall score satisfies a threshold;

in response to determining the overall score satisfies the threshold:

automatically enabling the customized automated assistant for performing the one or more automated assistant actions responsive to natural language input that is in the second language, performing the one or more automated assistant actions responsive to natural language input that is in the second language comprising using the translated second language components; and in response to determining the overall score fails to satisfy the threshold:

preventing the customized automated assistant from being automatically enabled to respond to second language input.

\* \* \* \* \*